(12) United States Patent
Spencer et al.

(10) Patent No.: US 12,062,148 B2
(45) Date of Patent: Aug. 13, 2024

(54) ON-DEMAND 3D IMAGE VIEWER

(71) Applicant: LiquidPixels, Inc., Fairport, NY (US)

(72) Inventors: Marc D. Spencer, Fairport, NY (US); Evan Chapman, Fairport, NY (US); Eric Cirone, Fairport, NY (US)

(73) Assignee: LiquidPixels, Inc., Fairport, NY (US)

( * ) Notice: Subject to any disclaimer, the term of this patent is extended or adjusted under 35 U.S.C. 154(b) by 0 days.

(21) Appl. No.: 17/962,224

(22) Filed: Oct. 7, 2022

(65) Prior Publication Data

US 2023/0368481 A1 Nov. 16, 2023

Related U.S. Application Data

(60) Provisional application No. 63/340,812, filed on May 11, 2022.

(51) Int. Cl.
*G06T 19/20* (2011.01)
*G06T 15/04* (2011.01)
*G06T 17/00* (2006.01)

(52) U.S. Cl.
CPC .............. *G06T 19/20* (2013.01); *G06T 15/04* (2013.01); *G06T 17/00* (2013.01); *G06T 2200/24* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | |
|---|---|---|
| 5,652,887 A | 7/1997 | Dewey et al. |
| 6,144,797 A | 11/2000 | MacCormack et al. |
| 6,356,283 B1 | 3/2002 | Guedalia |
| 6,496,849 B1 | 12/2002 | Hanson et al. |
| 6,523,063 B1 | 2/2003 | Miller et al. |
| 6,754,785 B2 | 6/2004 | Chow et al. |
| 6,816,907 B1 | 11/2004 | Mei et al. |
| 7,109,985 B2 | 9/2006 | Spencer et al. |
| 8,245,228 B2 | 8/2012 | Spencer et al. |
| 8,296,777 B2 | 10/2012 | Spencer et al. |
| 8,914,744 B2 | 12/2014 | Spencer et al. |

(Continued)

OTHER PUBLICATIONS

Maura Mengoni, Damiano Raponi, Roberto Raffaeli, "Web-enabled Configuration System for Interior Design", Apr. 2015, Taylor & Francis, Computer-Aided Design & Applications, vol. 12, Issue 6, pp. 753-764.*

(Continued)

*Primary Examiner* — Robert Bader
(74) *Attorney, Agent, or Firm* — McDonnell Boehnen Hulbert & Berghoff LLP

(57) ABSTRACT

An example embodiment may involve obtaining, by a graphical viewer, a 3D model of an object; requesting, by the graphical viewer, one or more 2D textures for the object from an image server application; receiving, by the graphical viewer, the one or more 2D textures from the image server application; possibly based on the 3D model of the object and the one or more 2D textures, generating, by the graphical viewer, a texturized image representation of the object; and displaying, by the graphical viewer, the texturized image representation of the object.

19 Claims, 28 Drawing Sheets
(19 of 28 Drawing Sheet(s) Filed in Color)

(56) References Cited

U.S. PATENT DOCUMENTS

| | | | |
|---|---|---|---|
| 2001/0044805 A1 | 11/2001 | Multer et al. | |
| 2002/0099911 A1 | 7/2002 | Mund et al. | |
| 2002/0120650 A1 | 8/2002 | d'Aquin | |
| 2003/0018732 A1 | 1/2003 | Jacobs et al. | |
| 2003/0113038 A1* | 6/2003 | Spencer | G06F 16/972 |
| | | | 382/305 |
| 2004/0054542 A1 | 3/2004 | Foote et al. | |
| 2004/0078491 A1 | 4/2004 | Gormish et al. | |
| 2006/0170693 A1 | 8/2006 | Bethune et al. | |
| 2006/0197781 A1 | 9/2006 | Arutunian | |
| 2006/0238547 A1 | 10/2006 | Spencer et al. | |
| 2006/0267982 A1 | 11/2006 | Aguera y Arcas | |
| 2007/0036462 A1 | 2/2007 | Crandall et al. | |
| 2008/0052242 A1* | 2/2008 | Merritt | G06F 21/10 |
| | | | 705/51 |
| 2009/0037838 A1 | 2/2009 | Gedye et al. | |
| 2015/0220244 A1* | 8/2015 | Vats | G06F 3/04845 |
| | | | 715/850 |
| 2015/0325044 A1* | 11/2015 | Lebovitz | G06T 15/04 |
| | | | 345/420 |
| 2016/0078506 A1* | 3/2016 | Sesti | G06Q 30/0603 |
| | | | 705/27.2 |
| 2016/0379339 A1* | 12/2016 | Ho | G06T 11/60 |
| | | | 345/427 |
| 2019/0114821 A1* | 4/2019 | Cernigliaro | H04N 19/94 |
| 2019/0192972 A1* | 6/2019 | Garbut | A63F 13/52 |
| 2023/0005230 A1* | 1/2023 | Fersund | G06T 19/20 |

OTHER PUBLICATIONS

Xin-juan Zhu, Haiqing Lu, Matthias Ratsch, "An interactive clothing design and personalized virtual display system", Apr. 12, 2018, Springer, Multimedia Tools and Applications, vol. 77, pp. 27163-27179.*

* cited by examiner

```
<script src="https://account.liquifire.com/zap/dhtml/com.liquidpixels.Surround.js"></script>
```

```
1  viewer = new com.liquidpixels.Surround(el, {
2    server: "account.liquifire.com",
3    uri: "account",
4    model: "https://server.com/model.glb",
5    textureMap: {
6      front: "https://server.com/front-texture.jpg",
7      back: "https://server.com/back-texture.jpg",
8    }
9  });
```

1  https://demos.liquifire.com/demos?set=color[#8B5FBF]
2  &set=base[https://demos.liquidpixels.com:443/data/mid-century-modern-chair-model/v2/Tool_baseColor.jpg]
3  &set=mask[https://demos.liquidpixels.com:443/data/mid-century-modern-chair-model/v2/chair_baseColor_mask.jpg]
4  &call=url[https://demos.liquidpixels.com:443/data/mid-century-modern-chair-model/v2/colorize.chain]
5  &sink=format[jpg],quality[50]

FIG. 5A

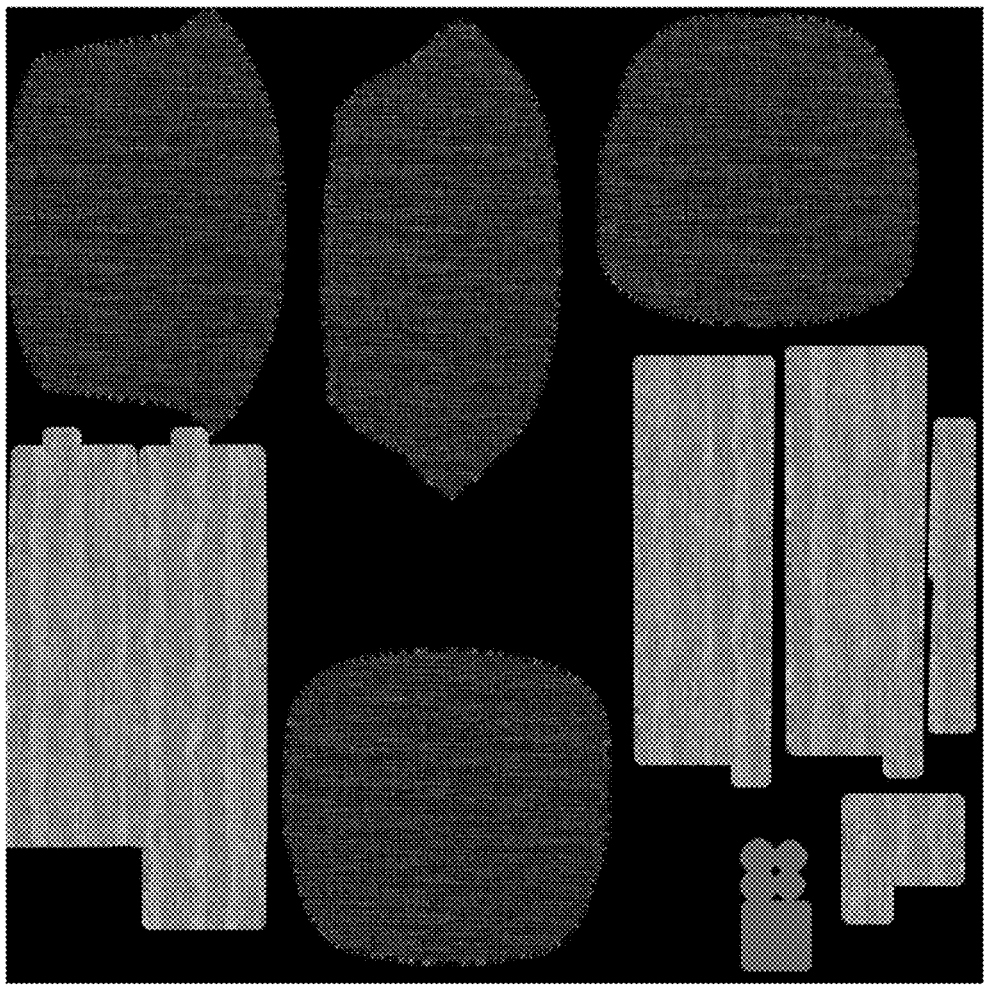

1 source=url[file:tote-front.jpg]&annotate=text[Monogram],font[myopentypefont],pointsize[40],
2 x[0],y[200]&colorize=fill[blue],opacity[50]&sink

FIG. 6

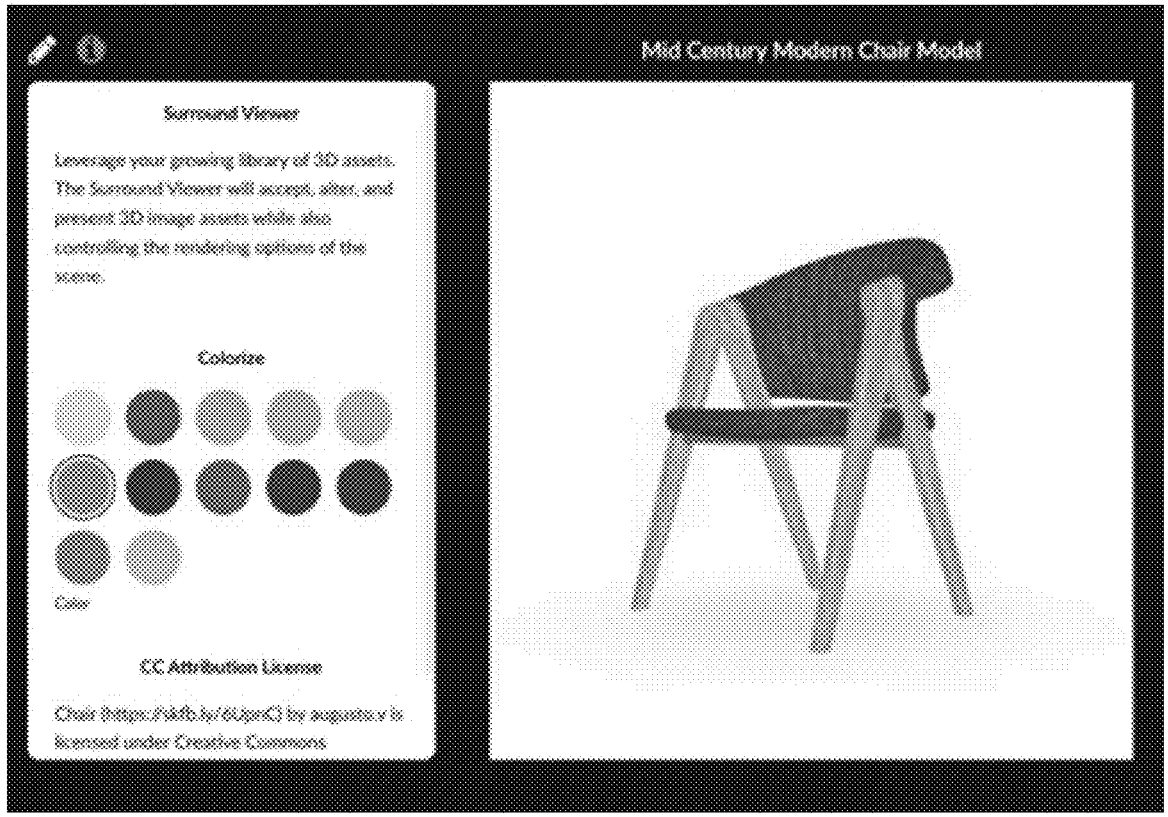

FIG. 7A

```
▼ Query String Parameters          view source        view URL-encoded set: color [#44BBA4]
  set: base[https://demos.liquidpixels.com:443/data/mid-century-modern-chair-model/v2/Tool_baseColor.jpg]
  set: mask[https://demos.liquidpixels.com:443/data/mid-century-modern-chair-model/v2/chair_baseColor_mask.jpg]
  call: url[https://demos.liquidpixels.com:443/data/mid-century-modern-chair-model/v2/colorize.chain]
  sink: format[jpg],quality[50]
```

FIG. 7B

```
GET https://demos.liquifire.com/demos?get=url[https%3A%2F
%2Fdemos.liquidpixels.com%3A443%2Fdata%2F3d-jewelry%2Fv6%
2FBraceletModels.glb] HTTP/1.1
Host: demos.liquifire.com
Connection: keep-alive
sec-ch-ua: ".Not/A)Brand";v="99", "Google Chrome";v="103",
"Chromium";v="103"
sec-ch-ua-mobile: ?0
User-Agent: Mozilla/5.0 (Windows NT 10.0; Win64; x64) AppleWeb
(KHTML, like Gecko) Chrome/103.0.0.0 Safari/537.36
sec-ch-ua-platform: "Windows"
Accept: */*
Origin: https://demos.liquidpixels.com
Sec-Fetch-Site: cross-site
Sec-Fetch-Mode: cors
Sec-Fetch-Dest: empty
Referer: https://demos.liquidpixels.com/
Accept-Encoding: gzip, deflate, br
Accept-Language: en-US,en;q=0.9
```

```
GET https://demos.liquifire.com/demos?set=assetserver:https%3A%2F
%2Fdemos.liquidpixels.com%3A443%2Fdata%2Fid-jewelry%2Fv1,color1s
27c49c21,color2ff,color3ff,color4ff,color5ff,color6ff,metalcolorb
3dcb1rdecal=url:https%3A%2F%2Fdemos.liquidpixels.com%3A443%2Fdata
%2Fid-jewelry%2Fimg%2FbraceletDemov1.chain&sink HTTP/1.1
Host: demos.liquifire.com
Connection: keep-alive
sec-ch-ua: ".Not/A)Brand";v="99", "Google Chrome";v="103",
"Chromium";v="103"
Origin: https://demos.liquidpixels.com
sec-ch-ua-mobile: ?0
User-Agent: Mozilla/5.0 (Windows NT 10.0; Win64; x64) AppleWebKit/537.36
(KHTML, like Gecko) Chrome/103.0.0.0 Safari/537.36
sec-ch-ua-platform: "windows"
Accept: image/avif,image/webp,image/apng,image/svg+xml,image/*,*/*;q=0.8
Sec-Fetch-Site: cross-site
Sec-Fetch-Mode: cors
Sec-Fetch-Dest: image
Referer: https://demos.liquidpixels.com/
Accept-Encoding: gzip, deflate, br
Accept-Language: en-US,en;q=0.9
```

Find... (press Ctrl+Enter to highlight all) | View in Notepad

Transformer | Headers | TextView | SyntaxView | ImageView | HexView | WebView
Auth | Caching | Cookies | Raw | JSON | XML Format: JPEG
48,709 bytes 2,000w x 2,000h
0.01 bytes/px
72 dpi
Baseline
Subsample@4:4:4
(non-opt)
APP0 Data (14 bytes)
[JFIF1.1]
DPI: 72
HuffmanTables: 4

Autoshrink

ON-DEMAND 3D IMAGE VIEWER

CROSS-REFERENCE TO RELATED APPLICATION

This application claims priority to U.S. provisional patent application No. 63/340,812, filed May 11, 2022, which is hereby incorporated by reference in its entirety.

BACKGROUND

Computer-generated (virtual) objects have been incorporated into images and video by use of three-dimensional (3D) models which allow computer rendering of the object, which can then be displayed as part of an image or video. Computer-generated 3D objects can also be enhanced by texture mapping, in which a two-dimensional (2D) image is wrapped on the surface of the 3D object, to produce, for example, a specific color, brightness, smoothness, or bumpiness on the object. The 2D image that is wrapped onto the 3D object generated by the 3D model is generally known as a texture map.

The increased incorporation of computer-generated objects in general display, virtual reality, and augmented reality environments puts an increased demand on the ability to rapidly access the correct object for placement in the display, where the object has the correct properties. Although computer-generated objects can be rendered and stored on a server for subsequent viewing via a display device (e.g., a browser running on a computer, app running on a smart phone, virtual reality goggles, augmented reality glasses), generation, storage, and transmission of the computer-generated objects becomes problematic when the number of possible objects is large. Similarly, maintaining a local library of computer-generated objects at the display device, where storage is more limited than on the server side, is impractical at best and becomes infeasible when the number of computer-generated objects is large or the detail of the objects is significant.

SUMMARY

An illustration of how the number of computer-generated objects becomes unwieldy when textures are applied to 3D models can be seen from the following examples. In the first example a furniture manufacturer is offering a particular item such as a wood chair that can be configured with or without side arms, in 6 different wood finishes, and can be covered with one of 12 fabrics. The number of possible combinations is 2×6×12=144. As such, it would be necessary to maintain 144 rendered objects to allow the viewer to choose any possible combination for viewing. Turning to an example involving jewelry, as will be subsequently illustrated, a ring having 6 mounted stones selected from a total of 12 different stones is offered in 8 different metals. The 6 stones can be ordered in any sequence, and as such the order is important. If no repetition of the stones is permitted the number of permutations of the stones is nPr where n equals the total number of objects (which in this case is 12 stones), r equals the number of objects selected (which in this case is equal to 6) and P is the permutation function which is n!/(n−r)!. The number of permutations of 6 stones of the 12 possible is equal to 665,280. When multiplied by the number of possible metal colors (8) the total number of configurations for the ring is found to be 5,322,240. As such, it would be necessary to store 5,322,240 computer-generated versions of the ring to allow customers to simply select a configuration of the ring and then view a previously developed 3D rendering of it. If repetition of the stone colors is allowed (e.g., stone color 3 can be the same as stone color 5) the number of permutations is equal to nr and with n=12 and r=6 is equal to 2,985,984. When multiplied by the number of possible metal colors the total number of configurations for the ring is equal to 23,887,872. Clearly, storing (and transmitting) such a large number of virtual objects is inefficient at best and impossible at worst from a memory and bandwidth perspective.

Additionally, if the textures offered for a particular object/product vary over time, as is likely the case for furniture, where the fabric supplier or suppliers may change or add to the fabric line, or when additional fabric suppliers are identified, it becomes necessary to continually generate computer objects corresponding to all of the possible fabric coverings for the furniture objects. Continually updating the computer-generated object library to include all of the fabrics and all of the combinations of furniture styles and fabrics also becomes unwieldy and potentially impossible if new fabrics/textures are continually introduced.

The demand for computer-generated objects is dramatically increasing, in a large part due to the advent of Augmented Reality (AR), in which the user's physical world is enhanced with computer-generated input. AR has become a desirable mechanism in allowing users to view computer-generated (e.g., virtual) objects in an actual physical environment. The AR environment adds additional requirements to the construction and display of computer-generated objects, as users are interacting with their physical environment with computer-generated objects that need to be updated, altered, and moved for correct display in the AR system.

In AR systems, users may combine their view of the physical world with a computer-generated overlay via the use of goggles which combine camera generated images or video with computer-generated overlays, smart glasses that provide a combined view of the physical world with a heads-up display, smart phones that image the physical world while providing an overlay of computer-generated images, or other combined display-imaging or display-viewing devices.

One of the applications of AR is to allow users to not only configure their own products (e.g., selection of the chair style, finish and fabric, or selection of the ring stones and finish as in the aforementioned examples) but to be able to view a computer-generated version of the product both on the screen as well as in a use environment. For example, a user may select and configure a chair and wish to view it in their home or office. A number of AR systems, ranging from smart phones to AR goggles and glasses, will allow the user to visualize the chair in the room where it will be located, simply by imaging the room through the smart phone, or by looking into the room with the AR goggles/glasses. The computer-generated chair is projected onto the display in the desired placement. In many instances, the user can rotate or move the computer-generated chair to show how the product would look in various positions. Similarly, users can view how jewelry, eyewear, and other accessories or clothing would look on them.

The computer-generated images that are to be overlaid with the image or video of the physical world should be generated in such a way as to allow them to be realistically combined with the image or video of the physical world. In addition, the user may change position with respect to the virtual object which may require updating of the virtual object to present it from the appropriate updated viewing angle. The user may request that the virtual object be altered to present an alternate style or texture (e.g., alternate style or covering for a piece of furniture represented as a virtual object in a room). As such, the virtual objects should be updated in near real time to be combined with the user's view of the physical world.

Methods and systems for rapidly and efficiently presenting and modifying computer-generated/virtual objects in both traditional displays as well as AR environments are desirable. Such methods and systems would benefit from being able to readily construct and display computer-generated objects and allow for near real-time modification of the objects, including the base object as well as any applied textures including color, pattern, and surface texture.

Additionally, it is desirable to rapidly incorporate changes in both the 3D models as well as the 2D textures used to create the computer-generated object. In environments in which multiple sources (e.g., manufacturers) can supply components or finishes for a product (e.g., fabrics for a chair) it is necessary to be able to readily allow the user to select from all of the available fabrics. Given that the fabric selection may vary, a system in which the computer-generated object can be constructed with the latest 3D model and latest selection of fabrics would be beneficial. Additionally, the fabrics may come from multiple sources/manufacturers, each of whose fabric selections may vary over time. The system should be able to be easily updated and should allow for the rendering of computer-generated representations of currently available products.

Virtual objects can be generated using a 3D model that allows for viewing of the object from different angles and positions, as well as for allowing for modification of textures (e.g., colors and fabrics as applied to items such as furniture). The resulting virtual object can be presented as part of an image or video stream based on physical reality including captured images or video as well as direct viewing.

The present invention may encompass the use of a graphical viewer that, in combination with a server-side device, receives 3D models of an object and constructs the virtual object locally for display in the combined physical reality-virtual reality environment. In one embodiment, the present invention accomplishes the construction of the virtual object by calls to the server for a 3D model, with subsequent calls for 2D texture files that when combined with the 3D model, allow for construction of the virtual object per the user's specification.

Examples of use of the method and system include allowing a user to visualize an item such as a sofa in an empty room. In some embodiments, this may involve the user employing goggles, a smart phone, or other user interface unit to visualize the sofa in the room. The user can even walk around the room to see the sofa from different perspectives. The user may then request (via the user interface unit) a different fabric for the sofa which results in an alternate 2D texture file being sent to the viewer. Based on that 2D texture file, the 3D model is updated and the sofa in the alternate fabric is presented to the user. Similarly, a user may be interested in seeing how a certain watch looks on their arm. The images of their arm are passed through the user interface unit (e.g., smart phone) and the graphical viewer requests a 3D model for the watch from the server. A corresponding 2D texture file can also be requested to create the user-selected virtual watch, which is then displayed on the captured or live image of their arm. The user may then select alternate watch faces which result in a call from the graphical viewer to the server for the 2D files corresponding to the alternate watch face. The updated virtual watch is then constructed for overlay with the physical image/video. Nonetheless, analogous features may be implemented by way of a computing device (e.g., desktop PC, laptop, or tablet).

An advantage of the present method and system is that the 3D models and 2D texture files can be stored remotely on one or more servers, and standard Internet (e.g., HTTP) protocols can be used to access the files. The graphical viewer can use the standard protocols to make simple requests for 3D models and 2D texture files, which can be transmitted on-demand based on both the user requests as well as the pre-determined presentation structure that has been dictated by the entity wishing to present the virtual object.

Another advantage of the present invention is that there are minimal limitations on the number of combinations of base objects (e.g., 3D models) and textures that can be used. In the previous example of a wood chair with different finishes and fabrics, the present invention allows for construction of the final object with a selected finish and fabric at the client side, without reliance on a pre-constructed set of objects. The number of combinations is only limited by the ability of the system to tabulate the models and textures and sources for the files. It is not necessary to have all of the 3D models and textures stored on a single server, since the 3D models and textures can be obtained from anywhere on the network.

In one embodiment, the 3D model can be altered or modified, allowing a user to make changes to the underlying model and structure. The modified 3D model can be stored locally, at the imaging server, or at another remote server. As such, the 3D model library can be enhanced by users as well as designers and developers. In one embodiment, a catalog of user designs is created by storing the user-modified 3D models. In one embodiment, the client-side viewer or device performs the modifications of the 3D model based on the user's requests and transmits copies of the modified files to one or more servers. In an alternate embodiment, the user's requested modifications are made at the server, which subsequently transmits the altered models to the user as well as storing a copy.

Similarly, the 2D textures can altered or modified, allowing a user to make changes to the texture in terms of color, pattern, or surface texture (e.g., bumpiness). The modified texture file can be stored locally, at the imaging server, or at another remote server. As such, the texture library can be enhanced by users as well as designers and developers.

In one embodiment, users can generate their own texture files on the fly for application to a 3D model and to create the final computer-generated object. In this embodiment, the user-generated texture files can be stored locally, at the imaging server, or at another remote server. The use of user generated texture files also allows for expansion of the texture library.

Using the present method and system allows for the presentation of virtual objects where there are a multitude of possible configurations, as with the aforementioned jewelry example. Using the present method and system allows the generation of a virtual representation of the ring based on the user's selection of the metal finish and sequence of 6 stones, without requiring the virtual objects to be previously rendered. As such, all 5,322,240 possibilities for the configurations of the ring can be developed with a single 3D model, 8 texture files representing the metal finish, and 12 texture files representing the stones. As will be discussed, once the user receives the 3D model and makes selections, the 2D texture files can be projected onto the 3D model at the client side to generate the final virtual ring.

In one embodiment, the 2D texture files are supplied from different sources and made available on a web site representing the manufacturer of the final item. For example, a sofa manufacturer may want to partner with various fabric suppliers in order to create a larger and more diverse selection of fabrics for the sofa. The sofa manufacturer can maintain a website that references the fabrics available from each supplier. In one embodiment, the website of the sofa manufacturer dynamically updates the available fabrics, such that the website references a server associated with the fabric supplier and displays the available fabrics from that supplier. If the supplier changes their selection of fabrics, it will be automatically updated on the sofa manufacturer's website. The fabric suppliers maintain a catalog of 2D texture files corresponding to their offered fabrics such that when a user selects a fabric the associated 2D texture file is transmitted, and the sofa is virtually upholstered with that fabric. The texture files need not be resident on the server associated with the sofa manufacturer. In this embodiment, suppliers of a component of an item (e.g., fabric) maintain their own catalog including 2D texture files, and allow the catalog and 2D texture files to be accessed as part of generating the virtual object.

Although described with respect to product offerings and visualization of customized objects for purchase, the inventions described herein are not limited to such applications, and can be used in the medical, military, architectural, transportation, service, and entertainment/recreational industries, as well as other fields.

As an example, a surgeon can utilize AR glasses/goggles to visualize an implanted device during a surgery, with the ability to customize the configuration of the device and observe how it will interact with the patient. An architect can utilize the invention to visualize a building in its environment, making changes to the building and observing how the changes impact the appearance in the context of the surroundings.

An example of recreational use of the invention is the placement of customized 3D objects in a drone flying area (e.g., drone racetrack). Flight Point of View (FPV) goggles provides drone pilots with a view from the camera of the drone. When flying in an empty field, room, or parking lot, virtual objects such as gates, flags, and arches can be customized and placed in the flying area as viewed through the FPV goggles. This allows for rapid configuration of the racetrack without the need to place actual physical objects.

Another of the advantages of the present method and system is the ability to rapidly act on user requests for changes in the virtual object viewing angle, placement, and texture. User requests for changes in these parameters are received via the client-side interface and the virtual object is modified accordingly not only in terms of the shape and texture of the object but in the placement and orientation in the display. In virtual reality or traditional display environments, the user thus has the ability to move the viewpoint to see the object from a different angle (e.g., rotating around the object or viewing it from above or below) as well as moving its location in the display or requesting changes to the texture. In AR environments, the client-side application can monitor the user position and report changes in viewing angle. In an AR environment, the user can also request changes in placement and texture of the virtual object, with those changes being executed locally and the display of the virtual object being updated accordingly.

As will be appreciated by one of skill in the art, other applications and embodiments of the inventions disclosed herein are possible and made advantageous through the transmission of the 3D model and texture files, with the ability to retrieve the 3D model and texture files from a plurality of locations. By assembling the desired virtual object at the client side, the methods and systems disclosed herein allow for the efficient customization of the virtual object, supporting very large numbers of combinations or permutations of specified parameters including but not limited to color, brightness, smoothness, height and patterns. By accessing a 3D model and textures on demand and assembling the virtual object at the client side, the need to pre-render and store (either at the server side or the client side) large numbers of virtual objects with different specified parameters is eliminated, as is the need to transfer multiple versions of a virtual object across the network. Furthermore, by allowing files to be retrieved from a plurality of locations it is possible to create a dynamic and large catalog of choices for customization. In embodiments where the parameters for the texture files are embedded in requests (such as an HTTP GET request), Internet protocols can be used to retrieve the desired files. This also allows for the ability to access multiple servers for files simply by specifying the source address for the server hosting the files.

Another advantage of the present methods and systems is the ability to customize or modify either the 3D model or 2D texture files at the client side. Once modified, the files can be stored locally for future use or transmitted to one or more receiving servers. This feature further increases the number of possibilities for the virtual objects and allows the end users themselves to expand the catalog of both 3D models and textures.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 5A depicts a specification of a LiquiFire Image Chain, in accordance with example embodiments.

FIG. 5B depicts a palette image containing requested textures, in accordance with example embodiments.

FIG. 6 depicts a specification of a texture, in accordance with example embodiments.

FIG. 7A depicts a screen from a graphical viewer, in accordance with example embodiments.

FIG. 7B query string parameters for a request, in accordance with example embodiments.

FIGS. 12A and 12B represent a flowchart and a network trace illustrating the retrieval of the 3D model, in accordance with example embodiments.

FIGS. 13A, 13B, and 13C represent a flowchart, a ring metal customization panel, and a network trace illustrating the retrieval of the texture to be applied to the 3D model, in accordance with example embodiments.

FIGS. 14A, 14B, and 14C represent a flowchart, a Stone 1 customization panel, and a network trace illustrating the retrieval of the textures to be applied to the 3D model, in accordance with example embodiments.

FIGS. 15A, 15B, and 15C represent a flowchart, a Stone 2 customization panel, and a network trace illustrating the retrieval of the textures to be applied to the 3D model, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

Figure 1:
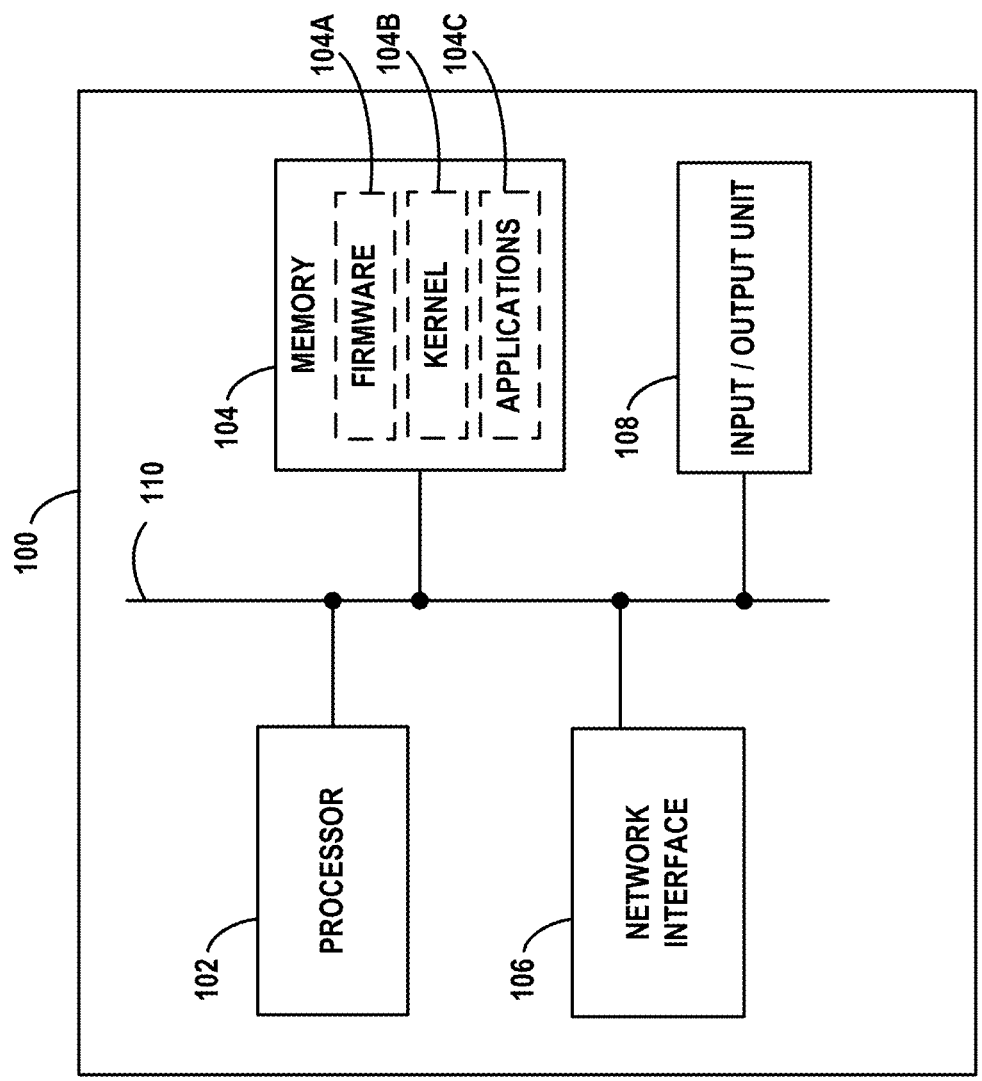
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or software-define wide-area networking (SD-WAN) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include other interfaces such as Ethernet, BLUETOOTH®, and Wifi.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

One or more computing devices like computing device 100 may be deployed to support the embodiments herein. The exact physical location, connectivity, and configuration of these computing devices may be unknown and/or unimportant to client devices. Accordingly, the computing devices may be referred to as "cloud-based" devices that may be housed at various remote data center locations.

Figure 2:
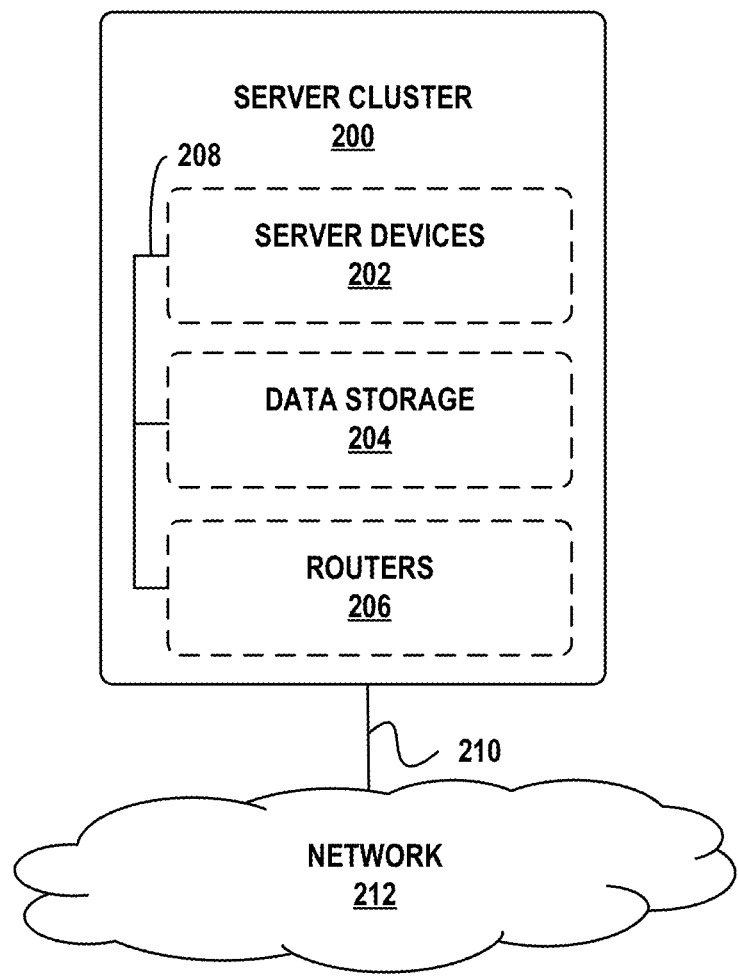
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations, or for use by a software application in some other fashion. Such a representation may take the form of a markup language, such as HTML, the eXtensible Markup Language (XML), or some other standardized or proprietary format.

Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

II. Example Dynamic Image Generation for Objects

Figure 3:
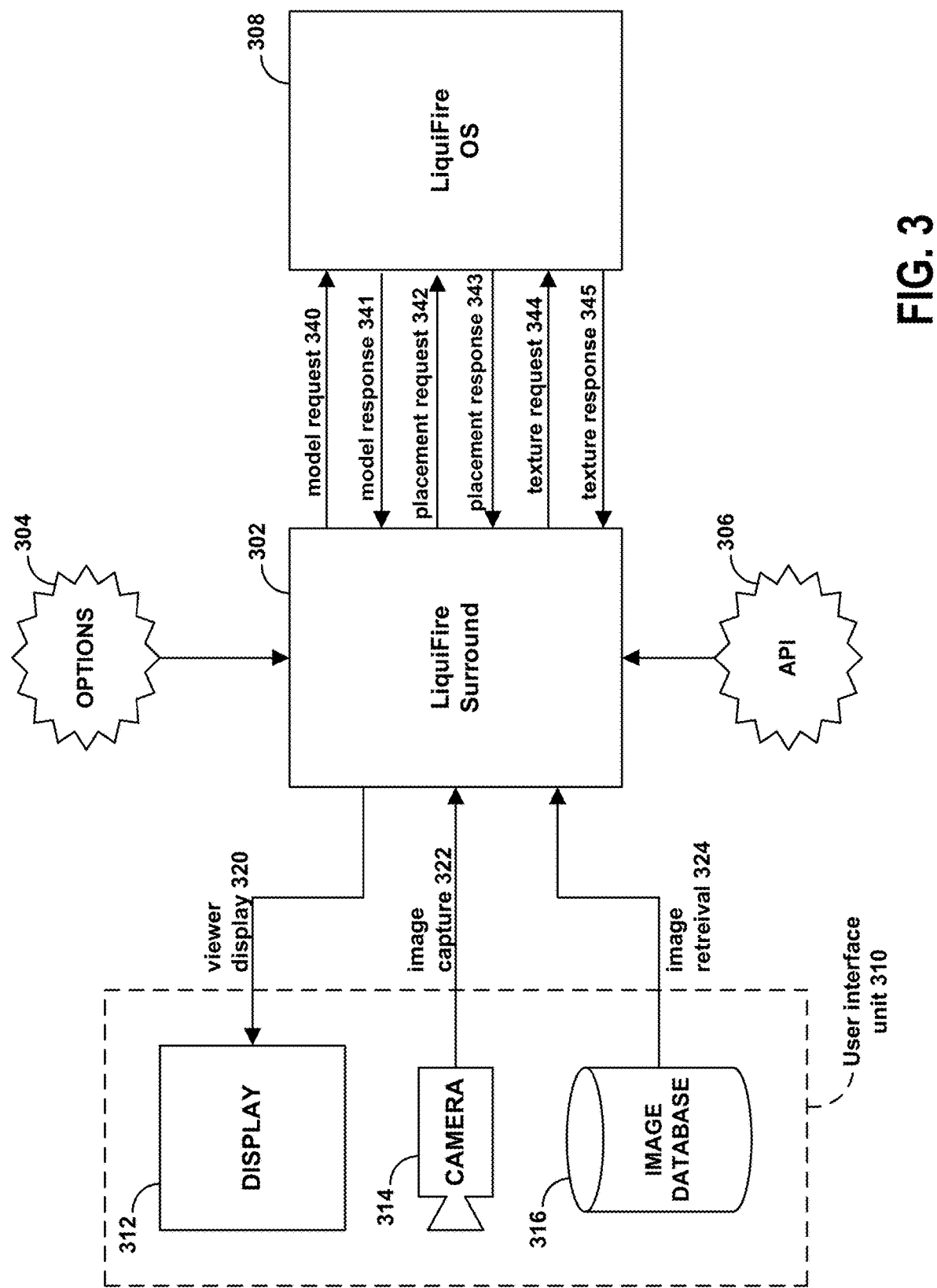
FIG. 3 depicts a software architecture, in accordance with example embodiments.

FIG. 3 depicts an example embodiment of the dynamic image generation capabilities described herein. This embodiment includes a user interface unit 310, examples of which include goggles which image physical reality in combination with computer-generated overlays and objects, smart glasses which incorporate a heads-up display with direct physical viewing, or smart phone devices that provide live viewing via a camera along with computer-generated overlays including virtual objects. The aforementioned examples are meant to be representative but not limiting examples of user interface units that may combine a view of physical reality with computer-generated objects and overlays.

User interface unit 310 also includes a display 312, which in one embodiment represents a web browser's software that can display such an object and/or other information on a screen of a user device (e.g., a desktop or laptop computer, a mobile device, a kiosk, etc.). In alternate embodiments, display 312 is in the form of a phone display, heads-up display, or projection device incorporated into goggles serving as AR goggles.

A camera 314 can also be included in user interface unit 310 and provides imaging of the physical world. An image database 316 can be incorporated to access stored images or video of physical reality upon which virtual objects can be presented. Images and video, in the form of received live optical signals or electronic images or video, are referred to generally as environmental images.

Signals to/from user interface unit 310 include viewer display signal 320 (which carries data representing virtual objects and overlays), image capture signal 322, which represents still or video data from camera 314, and image retrieval signal 324, which carries images/video from image database 316.

Graphical viewer 302 (denoted as "LiquiFire Surround Viewer" and alternatively referred to as "surround viewer") is a client-side application that can dynamically generate virtual objects to be displayed to the user via user interface unit 310. Options 304 are one or more parameters that control the operation of graphical viewer 302. API 306 is an application programming interface through which input can be provided to graphical viewer 302 and output can be received from graphical viewer 302. API 306 may be able to fully control aspects of the operation of graphical viewer 302. Image server application 308 (denoted as "LiquiFire OS") is configured to provide models and textures for objects upon request from graphical viewer 302.

The textures may be graphics and/or patterns based on mechanical features, environmental features, biological features, or other types of features. For example, textures may be of metal, chrome, plastic, wood, sand, water, skin, fur, feathers, cloth, fabrics, illustrations, drawings, text, and so on. Each texture may also have a color scheme of one or more colors. When used herein, the terms texture file, 2D texture file, or texture map refer generally to features (e.g., textures) that can be mapped onto a 3D model including but not limited to color, transparency, reflectivity, incandescence, bumpiness or surface texture and displacement. Types of texture files or texture maps include, but are not limited to color maps, metalness map, diffuse maps, Albedo maps, roughness maps, gloss maps, bumps maps, normal maps, and displacement maps. Formats for texture maps and texture files include but are not limited to .jpg, .gif, .tga, .exr, .tif, .bmp, .png, and .dds.

Notably, graphical viewer 302 may transmit a model request 340 to image server application 308, and image server application 308 may reply to this request with a model response 341 containing the specification of a requested model. Graphical viewer 302 can also transmit a placement request 342 to image server application 308 indicating one or more parameters specifying where the virtual object is to be placed. Placement response 343 may be transmitted from image server application 308 providing data regarding the placement. Further, graphical viewer 302 may transmit a texture request 344 to image server application 308 that specifies one or more textures, and image server application 308 may reply to this request with a texture response 345 containing a palette image containing the requested textures. The textures can be then be applied to the model and the resulting object displayed by the web browser. The requests and corresponding responses may be transmitted over a computer network such as the Internet. These requests and their associated responses may be combined into fewer than three respective sets of messages or implemented using more than three respective sets of messages. In any case, the components of FIG. 3 may be distinct software applications distributed in a client/server architecture.

Image server application 308 may support various image file formats, the ability to render and manipulate vector images like Encapsulated PostScript (EPS) and Scalable Vector Graphics (SVG), full International Color Consortium (ICC) color management international (Unicode) typographic support with full-page layout capabilities, and manipulation of Exchangeable Image File (EXIF) and International Press Telecommunications Council (IPTC) metadata. Assets, such as images, LiquiFire Image Chains, color profiles, and fonts can be acquired from many sources: over HTTP, the file transfer protocol (FTP), or from an image repository or database accessible to or associated with image server application 308.

With respect to the 3D models (sometimes referred to simply as a model) a variety of formats can be used including but not limited to USDZ files, OBJ (.obj) files, FBX files (.fbx), glTF and glTF 2.0 files (glTF), and GLB (.glb) files.

In some embodiments, all of the components of FIG. 3 may be operated on the same device (e.g., a client device such as a desktop or laptop computer, a mobile device, a kiosk, etc.), or combined in some fashion into a monolithic application. Other possibilities exist in which the components of FIG. 3 are deployed across a number interconnected devices.

Figure 4A:
FIG. 4A depicts a script tag, in accordance with example embodiments.

In some embodiments, graphical viewer 302 is launched by way of a JavaScript element on the web page of a web site. This can be done by adding a script tag pointing to an account associated with image server application 308 to obtain the JavaScript code. As example script tag is shown in FIG. 4A. The web site may be a third party web site, such as an e-commerce site, online store, or other site. Thus, the embodiments herein could be used for viewing options of customizable products (e.g., automobiles, furniture, and/or clothing). Alternatively or additionally, the embodiments herein could be used for scientific or engineering visualizations (e.g., for computer-aided design).

Figure 4B:
FIG. 4B depicts accessing textures for a 3D model, in accordance with example embodiments.

Once the JavaScript is loaded, the user can instantiate graphical viewer 302, providing it with options to obtain a model, the textures, and visual settings. The model and textures can be specified in the form of a LiquiFire Image Chain or one or more URLs. An example is shown in FIG. 4B.

Using a LiquiFire Image Chain provides customizability, allowing for the full power of image server application 308 to be used. Using a URL, graphical viewer 302 can turn that into a LiquiFire Image Chain to make a request to image server application 308.

Image server application 308 can use a LiquiFire Image Chain language parser to determine how to obtain and/or modify the model. The model can be stored with image server application 308, or image server application 308 can obtain the model from any accessible URL. Image server application 308 may then store the request in a cache and return the model to graphical viewer 302. In some cases, the model being requested is returned unmodified. In other cases, the model can be created from scratch or modified.

An example of such would be a model of a couch with short legs. The couch model could be modified by image server application 308 to lengthen the legs. Then the modified model can be provided to graphical viewer 302. Another example would be to create a model from scratch using the LiquiFire Image Chain language. For example, image server application 308 could create a beach ball by using common objects like spheres, and then add meshes (surfaces) on top of the sphere to place textures. This new model would be returned from image server application 308 to graphical viewer 302.

Graphical viewer 302 can then load the model. The model is prepared and graphical viewer 302 identifies options for the textures. Textures can be specified in one of two ways. Using one-to-many techniques, one texture can be provided and that texture would be applied to every mesh that the model contains. Using one to one techniques, a list of textures can be provided with keys that match the models mesh names. This allows a single texture to apply to a single mesh or one or more meshes. In other words, each mesh is given a unique identifier (key) and each texture is associated with a list of one or more of these identifiers so that the textures can be applied to the appropriate meshes. Graphical viewer 302 will then make one or more requests to image server application 308 with LiquiFire Image Chains to obtain the supplied textures. An example of how LiquiFire Image Chains are formatted and parsed can be found in U.S. Pat. No. 8,245,228, which is incorporated by reference in its entirety herein.

An example of a request for textures is shown in FIG. 5A. An example of a palette image containing the requested textures is shown in FIG. 5B. Notably, image server application 308 can combine all of the requested textures into a single palette image file for purposes of convenience and efficiency (e.g., transmitting one file with all textures is more efficient in terms of network capacity and processing than transmitting multiple files each with a single texture). As noted, each texture in the image may be associated with one or more unique identifiers of meshes to which the textures should be applied. Alternatively, the textures may be a single UV map that extends to encompass multiple combined meshes. The size and shape of each texture, as well as its associated unique identifiers, may appear in image metadata or separately from the image.

Graphical viewer 302 can take the texture that it received from image server application 308 and apply each texture to its corresponding mesh, based on the options that were provided by the user. The texture can be mapped to the mesh with 3D modeling texture mapping utilizing UV mapping. A UV map is the 2D (flat) representation of the surface of a 3D object. The U and V are the horizontal and vertical axis in 2D space, where X, Y, and Z are the axes in 3D space. During the 3D model creation, using 3D modeling software, the designer makes a UV map of what textures need to be applied to what surfaces (meshes). That UV map is outlined inside the 3D model. Graphical viewer 302 uses that UV map to take the textures that are returned from image server application 308 in a 2D space, and map them to the mesh in a 3D space.

An example use case for this is tote bag. The tote bag can be specified with a 3D model. The fabric that the tote bag is made of could be one of a multiple of colors. The tote bag could also have a monogram that is in the bottom left corner. Graphical viewer 302 would load the 3D model. For the texture that would be applied to the front facing mesh, graphical viewer 302 would request, from image server application 308, a texture that would set it to a color and apply a monogram selected by the user. The texture as a LiquiFire Image Chain might appear as shown in FIG. 6.

Thus, graphical viewer 302 can request, from image server application 308, a texture that would take the unwrapped texture for the tote bag, add a personalized monogram, and change the color. Graphical viewer 302 would then combine the received texture and/or other information, and display the resulting object to the user as personalized. In some embodiments, graphical viewer 302 or image server application 308 can modify any of the 3D models' image based Physical Based Rendering (PBR) maps like normal, roughness, or specular maps. These maps are used to render and dynamically modify photorealistic textures to create limitless customizability for a 3D model. Using graphical viewer 302 to utilize these maps to allow a user to be able to change, say, the shininess of a metal ring or the texture of a notepad to be rough like leather or be more shiny like plastic, for example.

Graphical viewer 302 allows the user to interact with the 3D model. The user can zoom in and out by using pinch gestures on a touch enabled device, or by using the scroll wheel on a mouse. The user can rotate the 3D model by swiping with their finger on a touch enabled device or using a mouse with a click and drag action on the 3D model. This amount of interactiveness provides the user with immense control and detail. In some embodiments, graphical viewer 302 may also be responsive to other types of human-computer interaction, such as AR or virtual reality gestures, if available.

An example screen from graphical viewer 302 is shown in FIG. 7A. The web interface includes a texture selector on the left (here, specifying only colors for purposes of simplicity) and an image of the object with the selected texture on the right. In response to the user selecting a texture from the texture selector, the image of the object is regenerated and displayed with that texture applied. In the example, the same texture (fabric) is used for the seat and backrest of the chair, and another texture (woodgrain) is used for the legs and armrests. Though not shown in FIG. 7A, the woodgrain texture may also be customizable. The texture selector is not required to be part of graphical viewer 302, and other user interfaces with the same or different capabilities may be used. Notably, graphical viewer 302 can accept input from an arbitrary user interface and use the indicated user interface selections to update/alter the presented object, textures, lighting, camera, etc.

An example texture request is shown in FIG. 7B. This request may be transmitted in response to the user selecting a texture in graphical viewer 302. As shown, the request includes a color and a mask, and then calls the LiquiFire Image Chain to produce a palette image containing the appropriate textures.

Figure 8:
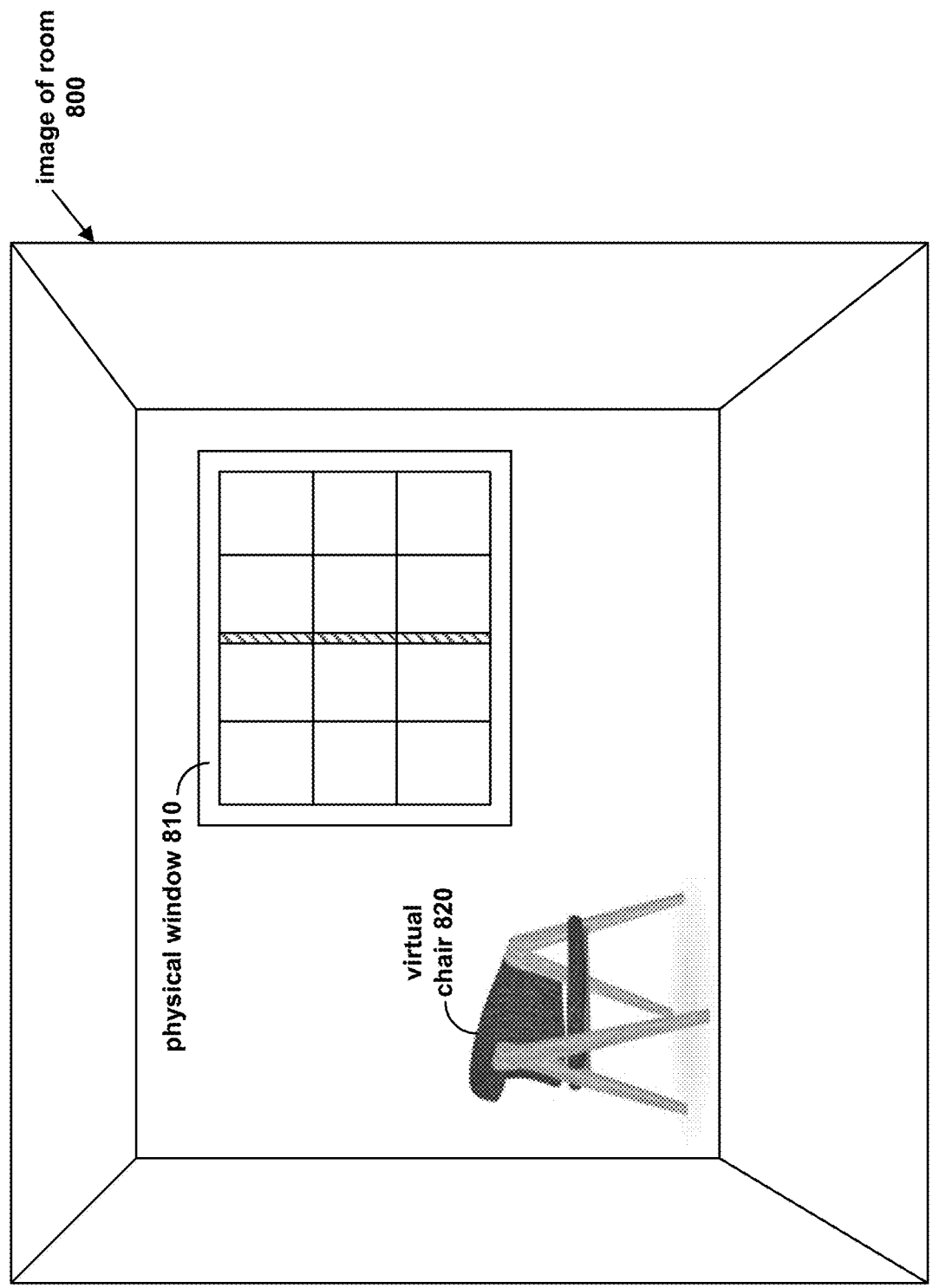
FIG. 8 depicts a representative view of a physical room with a window and an overlay of a virtual object of a mid-century modern chair, in accordance with example embodiments.

FIG. 8 represents an image of a room 800 which can either be a physical image viewed directly by the viewer/user or a displayed or projected image from display 312 in user interface unit 310. In the example shown in FIG. 8, a physical window 810 is present in the room. A virtual chair 820 is presented as a virtual object based on the 3D model and 2D texture obtained by graphical viewer 302 from image server application 308.

Notably, LiquiFire OS can place models anywhere in a scene based on configuration or user input. For example, it can place a couch and a lamp in a room. Furthermore, the system can track motion delta, velocity of swipes, movements, and any other calculations made across time. Further, tracking capabilities may include the orientation of an object (e.g., if it is upside-down, rightside-up, etc.), as well as AR background movement. Additionally, the system can move the camera and/or camera angle based on background movement, track elements in a room, and/or move other objects based on a tracked object.

Additional features that may be combined with any one or more of the embodiments herein include the following.

Regarding the surround viewer: it may ask LiquiFire OS for a model, it may ask LiquiFire OS for multiple models in a common transaction or in multiple different transactions, it may assemble received models into layers, and/or it may ask LiquiFire OS to combine multiple models into a single model and return the single model in a single transaction.

Regarding the 2D textures: The surround viewer may ask LiquiFire OS for one or more 2D images that represent textures for a layer(s) on the 3D model, the surround viewer may ask LiquiFire OS for a 2D image that affects the model's physically-based rendering that includes but it not limited to reflection, diffusion, translucency and transparency, conservation of energy, metallicity, Fresnel reflection, and/or microsurface scattering.

Regarding user interaction: The surround viewer may send data to a server that represents how a user interacts with the viewer and the 3D model. The data that can be sent includes but is not limited to camera position in scene (x, y, z), camera properties (e.g., azimuth angle, polar angle, dolly distance, dolly minimum distance, dolly maximum distance, zoom level), touches/clicks within the viewer (e.g., parts of model that is interacted with, where in the scene is the interaction happening, scroll wheel/pinch gesture to dolly camera in or out, and/or double click to reset model), and/or current textures being used at time of interaction.

Regarding the surround viewer API, the surround viewer is able to interact with the model as follows: start/stop individual or multiple animations, update textures for all layers, update textures for named layers, get all textures currently being used in the model, export the model, check for viewer readiness, move the camera dolly to an absolute position, move the camera dolly to a relative position, rotate the camera to an absolute angle, rotate the camera to a relative angle, get information about the camera (e.g., azimuth angle, polar angle, dolly distance, dolly minimum distance, dolly maximum distance, zoom level), get information about the position of the camera in (x, y, z), change where the camera focuses on the model (e.g., change it immediately, change it with an animation, change it to a named section or mesh of the model, and/or reset to the starting position).

III. Example Operations

Figure 9:
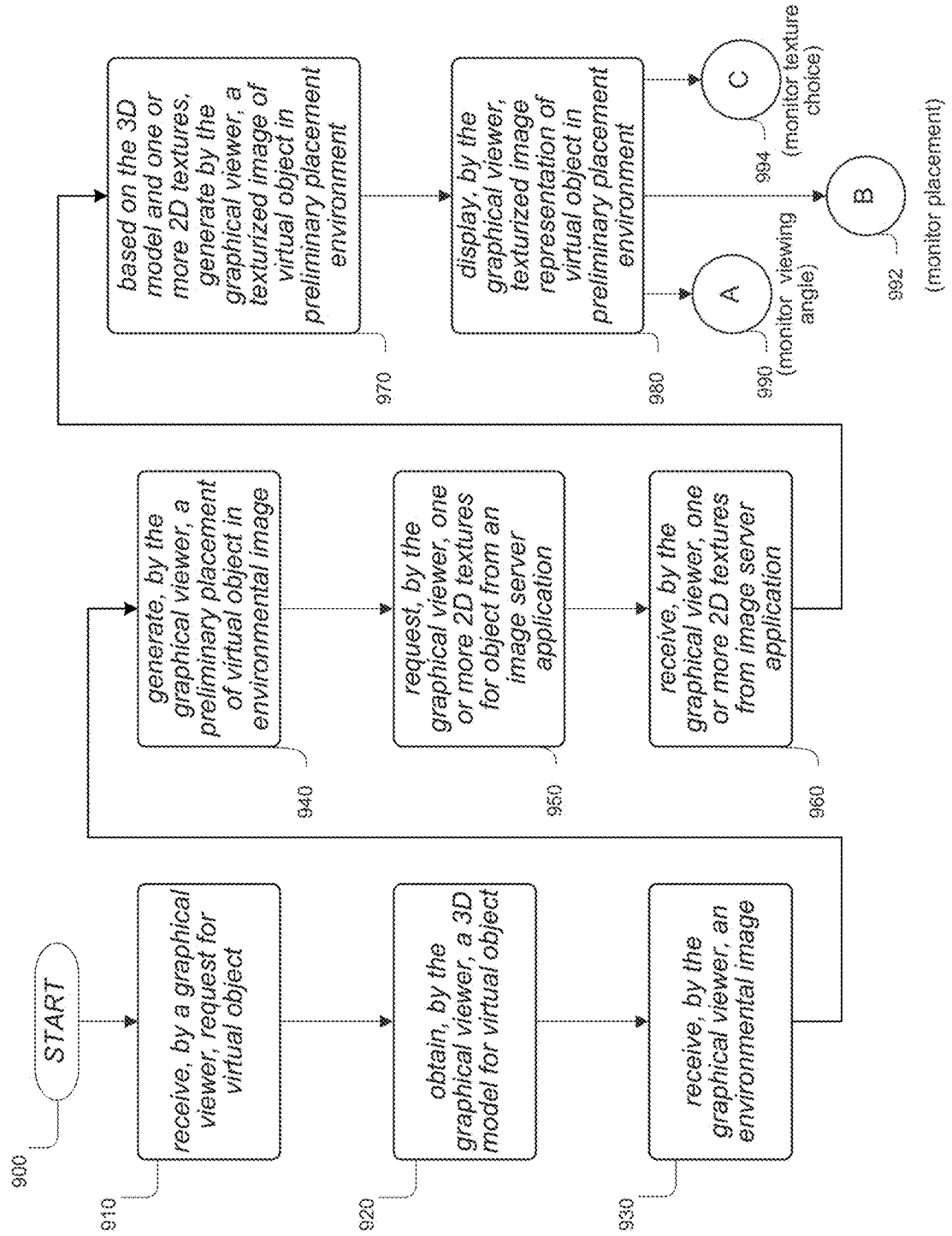
FIG. 9 represents a flowchart for the initial presentation of a virtual object in an environmental image (physical reality image), in accordance with example embodiments.

FIG. 9 is a flow chart illustrating an example embodiment. The operations illustrated by FIG. 9 may be carried out by a computing system or computing device that includes a software application configured to render virtual 3D objects and place them appropriately with respect to the physical reality (environmental) image. Non-limiting examples of the computing system or computing device include computing device 100 or server cluster 200, for example. However, the operations can be carried out by other types of devices or device subsystems. For example, the operations could be carried out by a portable computer, such as a laptop or a tablet device.

The embodiment of FIG. 9 may be simplified by the removal of any one or more of the features shown therein. Further, this embodiment may be combined with features, aspects, and/or implementations of any of the previous or following figures, or otherwise described herein. Such an embodiment may include instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the embodiment.

Block 900 involves the start of the exemplary process. Block 910 involves obtaining, by a graphical viewer, a request for a virtual object. This request can be generated through user interaction with the graphical viewer including, but not limited to, making a selection through a keyboard, mouse or other user input device associated with a computer and associated display, making a selection on a touch screen of a smart phone, making a selection through a user interface on AR or VR goggles (such as a five directional button, also known as a 5D button, that tilts in 4 directions for highlighting an item on a menu and can be pushed in for selection of that menu item) or through other types of selection devices and user interfaces familiar to one of skill in the art.

Block 920 involves requesting, by the graphical viewer, a 3D model for the virtual object. This can be accomplished in a number of ways including but not limited to http, https, and ftp get or post requests. In one embodiment, the graphical viewer employs LiquiFire OS commands, resulting in a model chain that retrieves the model from a specified server. In one embodiment, the 3D models may be hosted on a particular and predesignated server, while in an alternate embodiment, the server may be designated prior to the request. Additionally, the server may change based on where the 3D models are stored. The request may contain arguments specifying aspects of the requested 3D model. In some implementations, all models are retrieved from LiquiFire OS through LiquiFire Surround.

Block 930 involves receiving by the graphical viewer, an environmental image representing physical reality. In one embodiment, this is live video captured from a camera associated with the device on which the graphical viewer is running including but not limited to a smart phone, or AR or VR goggles. In an alternate embodiment, a single image is captured and is utilized as the environmental image. In yet another embodiment, the environmental image is retrieved from a server, which stores images or video of the environment in which the virtual object is to be placed. The file formats for the environmental image include but are not limited to .jpg, .png, .gif, .mp4, .mov, .wmv. In another embodiment, such as can be encountered with a heads up display, the environmental image is the actual view of the environment as seen by the user through their eyes.

Block 940 involves generating, by the graphical viewer, a preliminary placement of the virtual object in the environmental image. In this step, data representing the coordinates for placement of the object in the environmental image are received or generated. In one embodiment, the default placement is in the center of the screen/image and as such the coordinates represent that location. In an alternate embodiment, the user can specify, via a user interface mechanism such as those described with respect to the request for the virtual object, a preliminary placement location. The selected location can be specified using coordinates relative to the image plane (e.g. X-Y coordinates on the environmental image) or 3 dimensional coordinates corresponding to absolute location in the environment.

Block 950 involves requesting, by the graphical viewer, one or more 2D textures for the object from the image server application. The 2D textures are requested using a suitable request for files such as http, https, and ftp get or post requests although other methods of file retrieval may be used. As with the 3D model, the 2D texture files may be stored on (and retrieved from) a single predetermined server or the files may be stored on multiple servers including servers which are dynamically chosen based on the availability of new textures.

Block 960 involves receiving, by the graphical viewer, the one or more 2D textures from the image server application. In this step, the texture files are received and downloaded from the designated server(s) and made accessible to the graphical viewer application.

Block 970 involves generating by the graphical viewer, and based on the 3D model and one or more 2D textures, a texturized image of the virtual object in the preliminary placement in the environmental image. This results in the virtual object being rendered based on the 3D model and applied texture.

Block 980 involves displaying, by the graphical viewer, the texturized image representation of the virtual object in the preliminary placement in the environment. With the virtual object rendered, the graphical viewer is able to place the object in the field of view such that it is superimposed over the image of the environment. As such the user sees the virtual object in its preliminary placement in the screen (display, goggles, or other visualization or imaging device).

Figure 10:
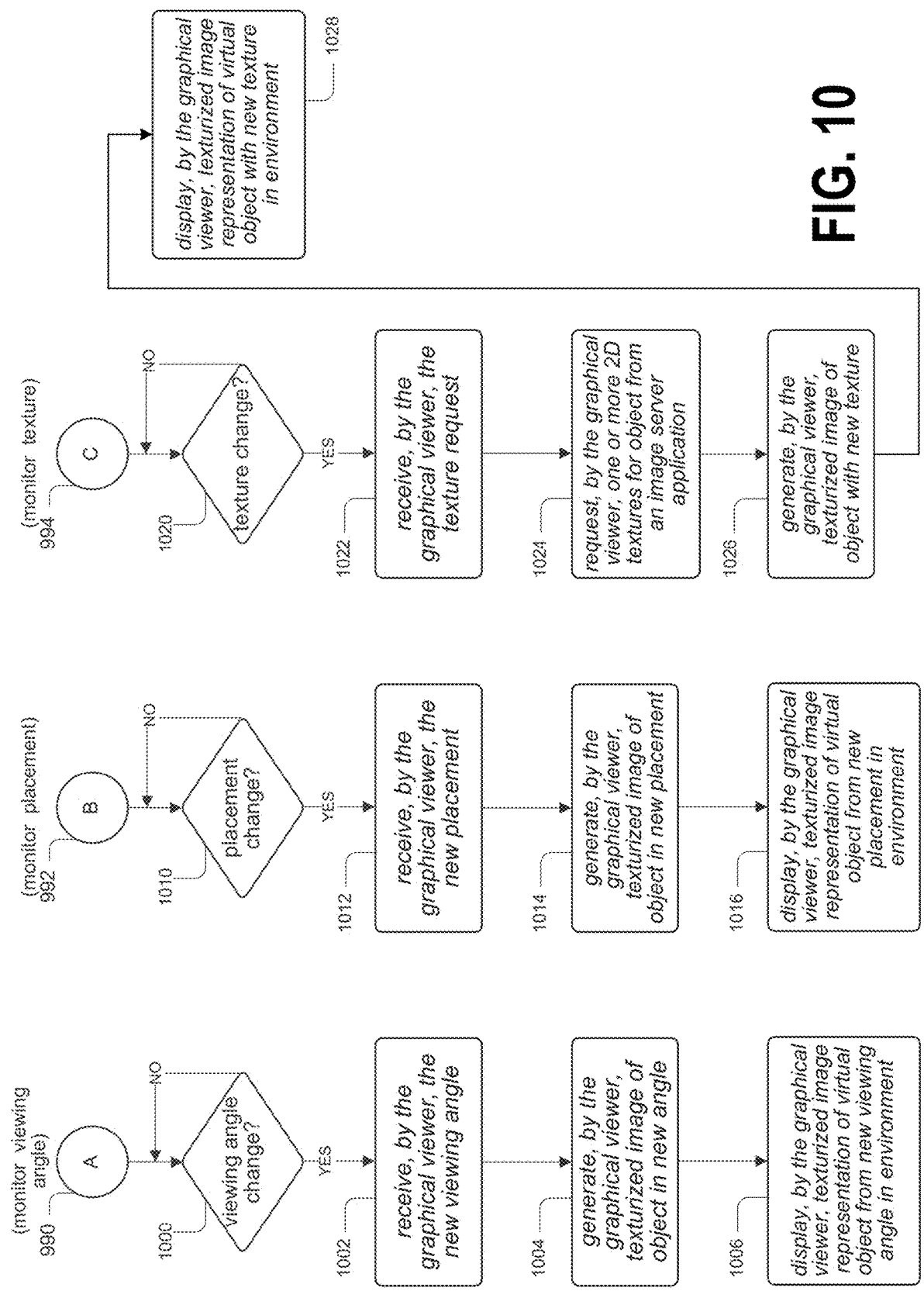
FIG. 10 represents a flowchart for adjustments to the virtual object based changes in viewing angle, placement, and texture, in accordance with example embodiments.

Connector 990 represents a connection to the monitor viewing angle process illustrated in FIG. 10.

Connector 992 represents a connection to the monitor placement process illustrated in FIG. 10.

Connector 994 represents a connection to the monitor texture choice process illustrated in FIG. 10.

FIG. 10 illustrates three exemplary processes that the graphical viewer may execute based on monitoring user interface unit 310 for requests related to changes in viewing angle of the virtual object, as requested by user input or required by movement of the user in physical reality, changes in placement of the virtual object in the environmental image, or requested changes in the texture of the virtual object.

Connector 990 indicates the initiation of the process in which test 1000 monitors changes in the viewing angle. A change in the viewing angle may take place based on a request from the user, in which they manipulate the virtual object on the screen (e.g. by touching and swiping the object to rotate it) or through a change in position such as when they walk around the object in an augmented reality environment. In the first instance, the user requests the change in viewing angle through a suitable interface (e.g. screen swipe, mouse, keyboard) while in the second instance the goggles or other viewing device register the change in position of the viewer with respect to the environment through positional awareness, or receive a command requesting a change in the placement of the virtual object (e.g. rotation).

As an example, the user may be looking at a virtual sofa which has been placed in an empty living room of their home, thus giving the user the ability to see what the sofa would look like in their home. In the first instance, the user may be using a smart phone to visualize the sofa in the room. The user may choose to rotate the sofa to see how it looks in a different placement and can execute that request by swiping on the sofa on the screen of the smart phone. Alternatively, the user may leave the sofa in the initial placement but walk around it to see how it looks from a different angle.

In the second instance, the goggles use positional awareness to sense that the user has changed location and is viewing the virtual object from a different angle or receive user input indicating the desire to rotate the object. In addition to positional awareness, the goggles may use eye tracking or gesture monitoring to determine the new viewing angle or new placement angle.

Block 1002 involves receiving, by the graphical viewer, the new viewing angle as determined by a request from the user, or by monitoring the user's position in or view of the physical environment as represented in the environmental image. Once the new placement or viewing angle is determined via the display device or goggles, the graphical viewer receives the information in terms of relative or absolute positional coordinates.

Block 1004 involves generating, by the graphical viewer, the texturized image of the object in the new angle. Using the new coordinates, the graphical viewer can re-render the virtual object as seen from the new viewing angle.

Block 1006 involves displaying, by the graphical viewer, the texturized image representation of the virtual object from the new viewing angle in the environment. With the virtual object rendered from the new viewing angle, it can be presented in the display.

Connector 992 indicates the initiation of the process in which test 1010 monitors changes in placement of the virtual object in the environment. As with the viewing angle, the system monitors the placement of the object in the environment. The placement may vary based either on movement of the user with respect to the virtual object, or through requests to move the object.

In the first instance, the viewer may be moving with respect to the virtual object. In the example of a virtual sofa placed in a living room, the user may walk towards the sofa, thus changing the relative positioning of the user with respect to the sofa (alternatively, movement may be based on user input—e.g., from a keyboard and/or mouse—as well). As the user walks towards the sofa the sofa will necessarily need to appear larger and will fill more of the screen. In the second instance the user may request a new placement of the virtual object (e.g. sofa) which is an absolute change in placement. As described above with respect to angle, the relative positioning may be determined via positional awareness, and changes in absolute placement may be requested via a suitable user interface.

Block 1012 involves receiving, by the graphical viewer, the new placement of the virtual object in the environment. The new placement can be described by absolute or relative coordinates.

Block 1014 involves generating, by the graphical viewer, the texturized image of the object in the new placement. With the new placement of the virtual object received by the graphical viewer, the viewer can re-render the object in its new placement, making the appropriate changes in perspective and presenting the object in its new placement.

Block 1016 involves displaying, by the graphical viewer, the texturized image representation of the virtual object in the new placement in the environment. With the virtual object rendered in its new placement, it is displayed in that placement on the environmental image.

Connector 994 indicates the initiation of the process in which test 1020 monitors changes in the texture of the virtual object in the environment.

Block 1022 involves receiving, by the graphical viewer, the request for the new texture. The user may request an alternate texture (e.g. different fabric for a sofa), In an embodiment, the user requests an alternate texture via a user interface associated with the display or goggles. In an embodiment, the alternate textures are presented in the display and the user can navigate to and select an alternate texture.

Block 1024 involves requesting, by the graphical viewer, one or more 2D textures for the object from the image server application. With the new texture selected, the graphical viewer may request the texture file(s) from one or more servers.

Block 1026 involves generating by the graphical viewer, the texturized image representation of the virtual object with the new texture. The virtual object is rendered with the new texture.

Block 1028 involves displaying, by the graphical viewer, the texturized image representation of the virtual object from with the new texture in the environment.

FIGS. 11-17 illustrate flowcharts and display screens for the customization of a piece of jewelry (a ring) which as previously described can be configured with 6 stones in a specified sequence along with a selected metal finish. There are 8 possible metal finishes and the 6 stones can be selected from 12 stones.

Figure 11:
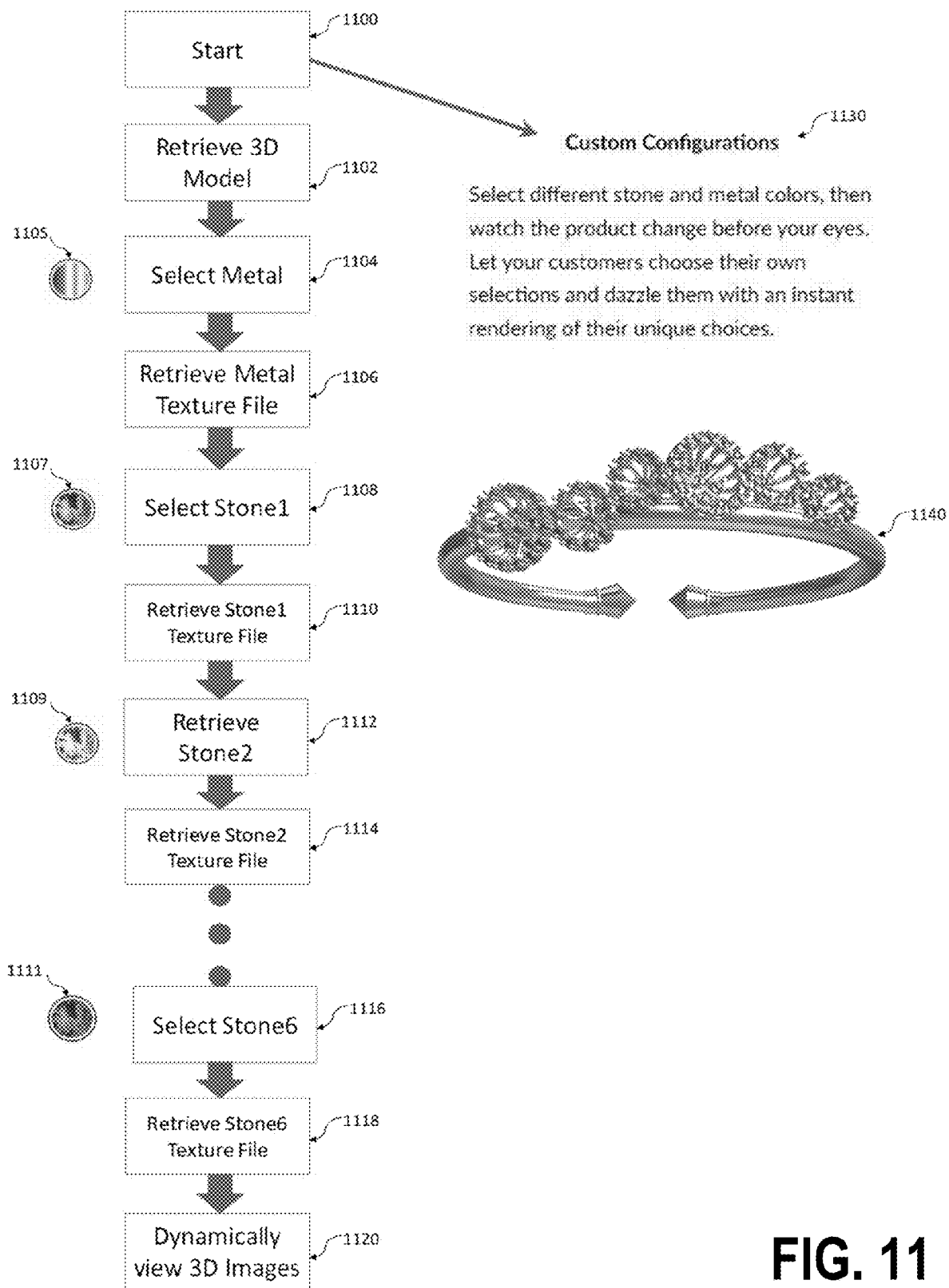
FIG. 11 represents a flowchart along with associated custom configuration text and the starting 3D model, in accordance with example embodiments.

Referring to FIG. 11, start step 1100 results in a custom configuration option 1130 presented to the user along with an initial virtual object 1140. In one embodiment, the initial virtual object 1140 is a previously rendered virtual object (transmitted to the graphical viewer or embedded in the graphical viewer application when loaded at the client-side) while in an alternate embodiment, a default 3D model and 2D texture files are transmitted to the graphical viewer for construction of initial virtual object 1140.

Figure 12A:
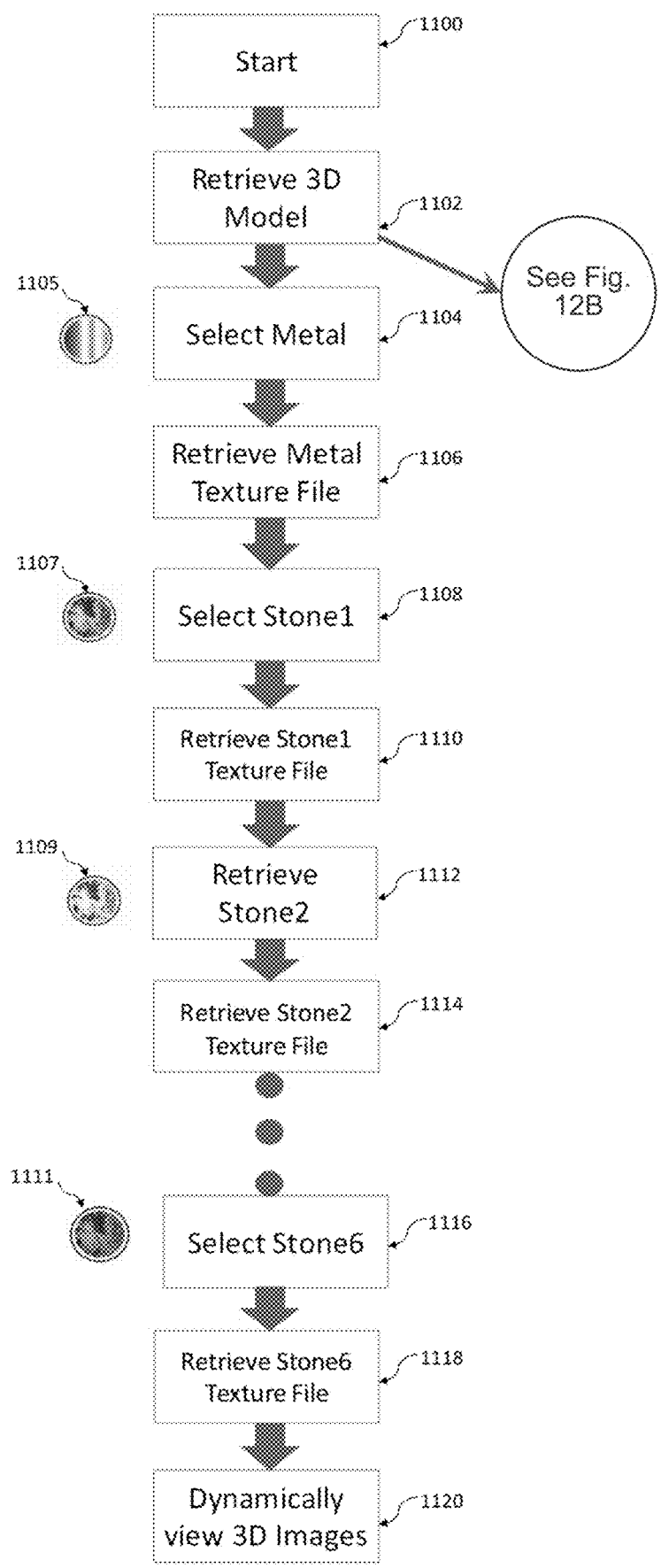

Referring to FIGS. 12A and 12B, a Retrieve 3D Model step 1102 is illustrated by means of Retrieve 3D Model trace 1200, which illustrates the GET https://[URL] command with parameters that result in the receipt of the 3D model file named 2FBraceletModel9.glb.

Figure 13A:
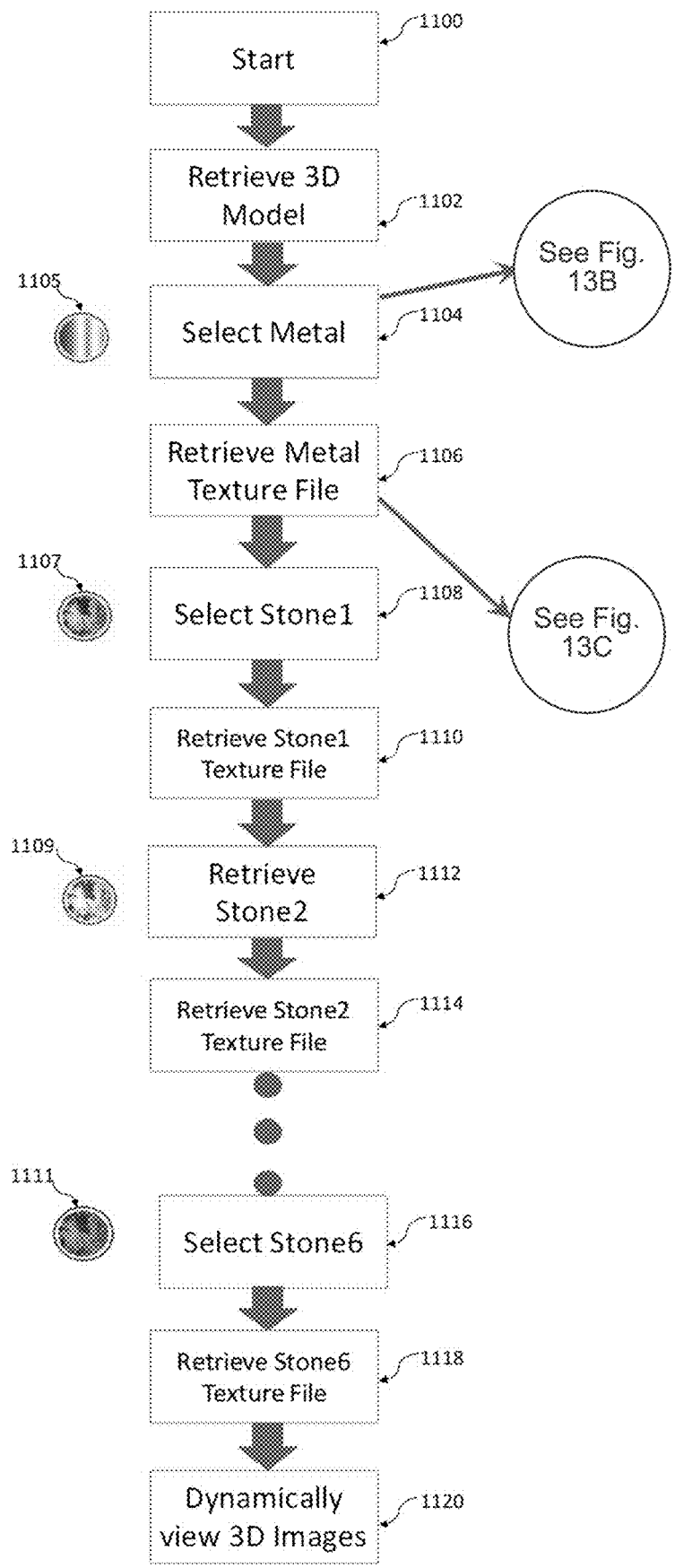
Figure 13B:
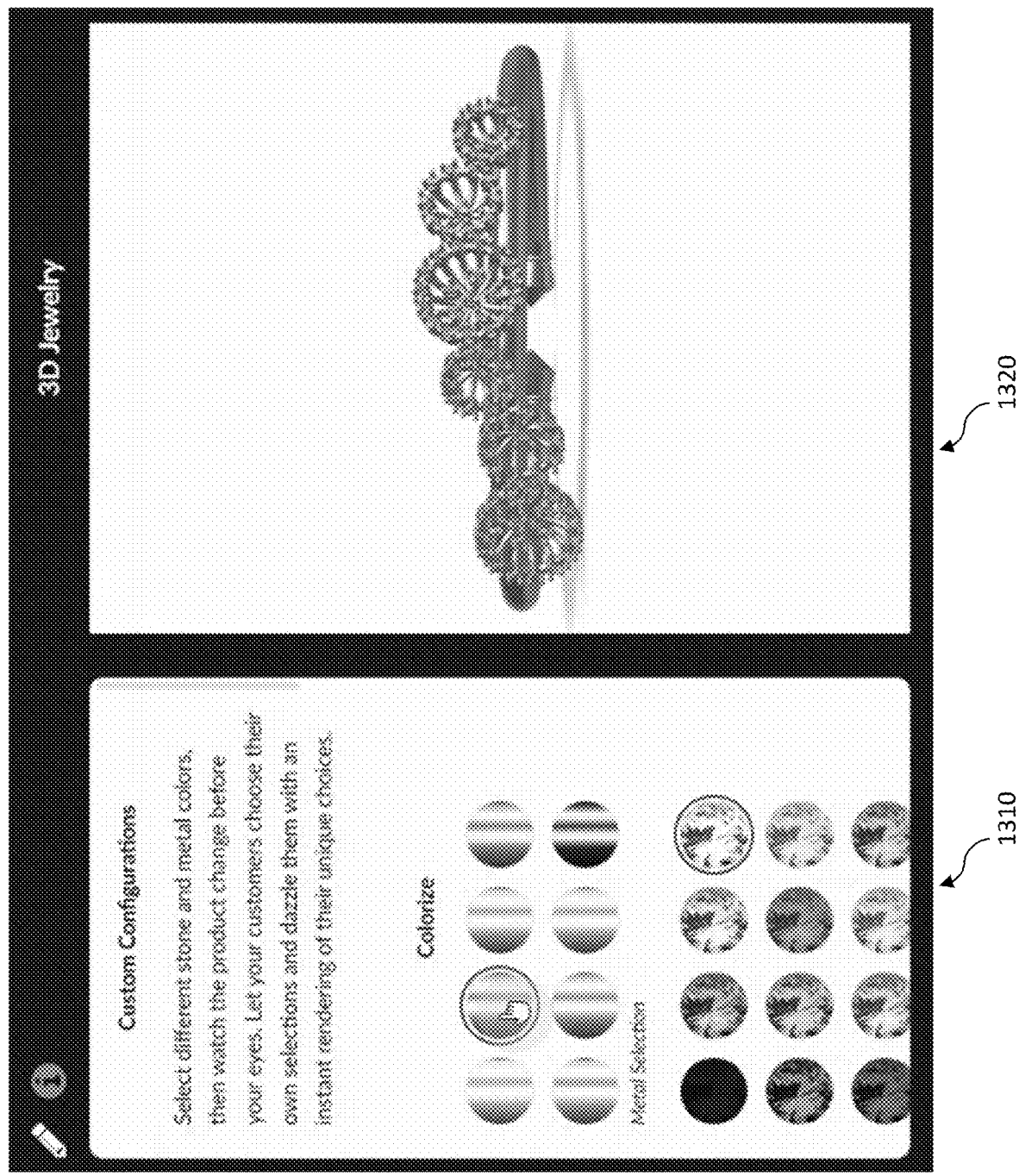

FIGS. 13A, 13B, and 13C illustrate a Select Metal step 1104 which receives the user input regarding metal selection 1105 and a Retrieve Metal Texture File 1106 step which retrieves the texture files associated with the user selection of the metal finish. A metal selection user panel 1310 is illustrated, along with a metal selection virtual object panel 1320. A Metal Finish Retrieve Texture File network trace panel 1340 is illustrated indicating the GET https://[URL} command with parameters that results in the retrieval of the metal selection JPEG file containing metal selection images 1350.

Figure 14A:
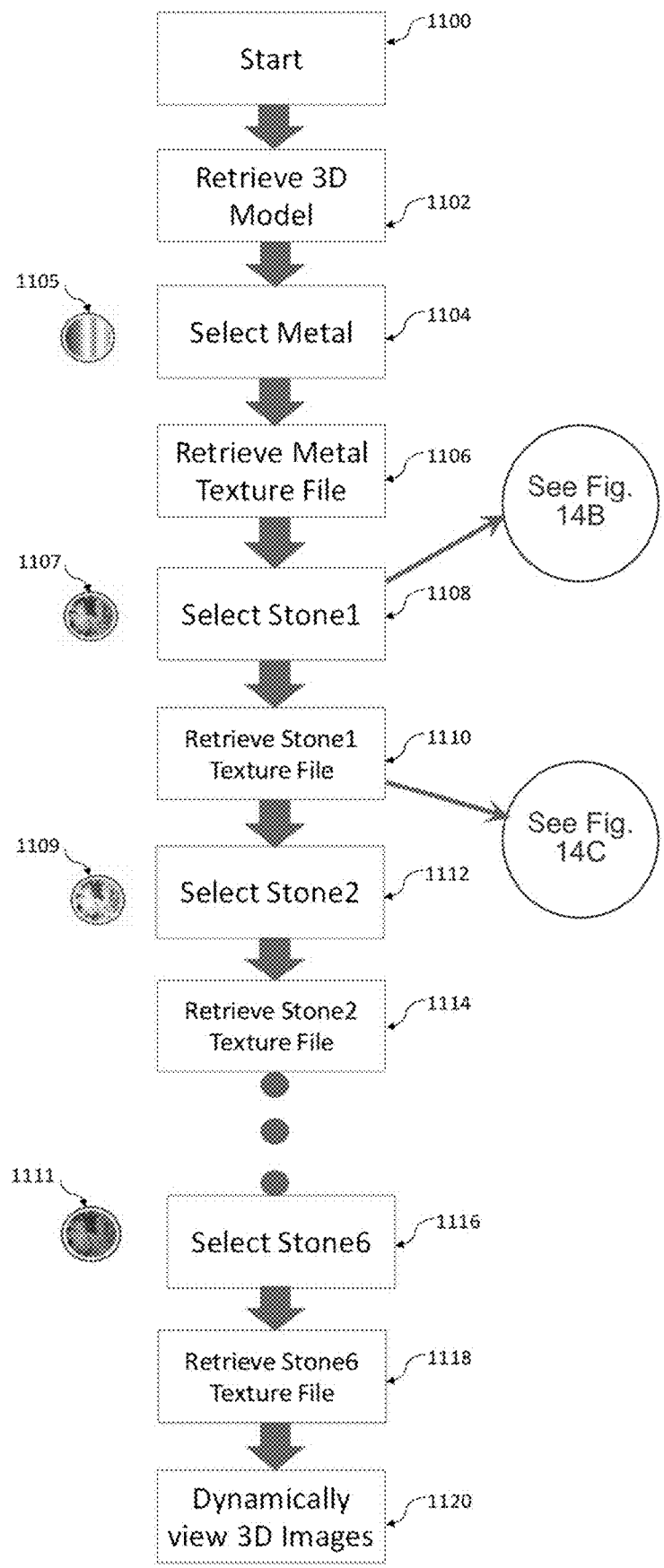
Figure 14B:
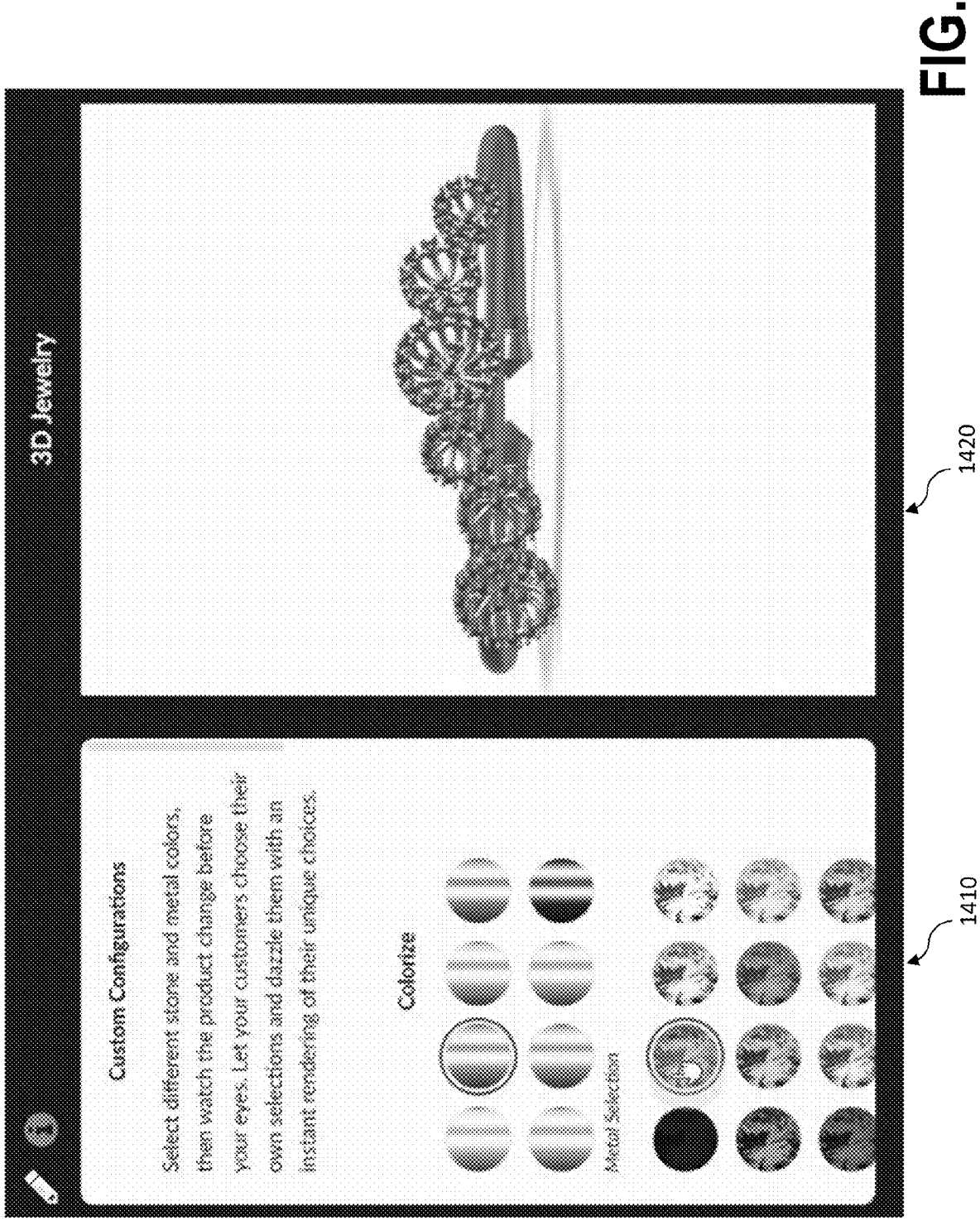

FIGS. 14A, 14B, and 14C illustrate a Select Stone1 step 1108 which receives the user input regarding stone 1 selection 1107 and a Retrieve Stone1 Texture File 1110 step which retrieves the texture files associated with the user selection of stone 1. A stone 1 selection user panel 1410 is illustrated, along with a stone 1 selection virtual object panel 1420. A Stone 1 Retrieve Texture File network trace panel 1440 is illustrated indicating the GET https://[URL} command with parameters that results in the retrieval of the stone 1 selection JPEG file containing metal selection and stone 1 images 1450.

Figure 15A:
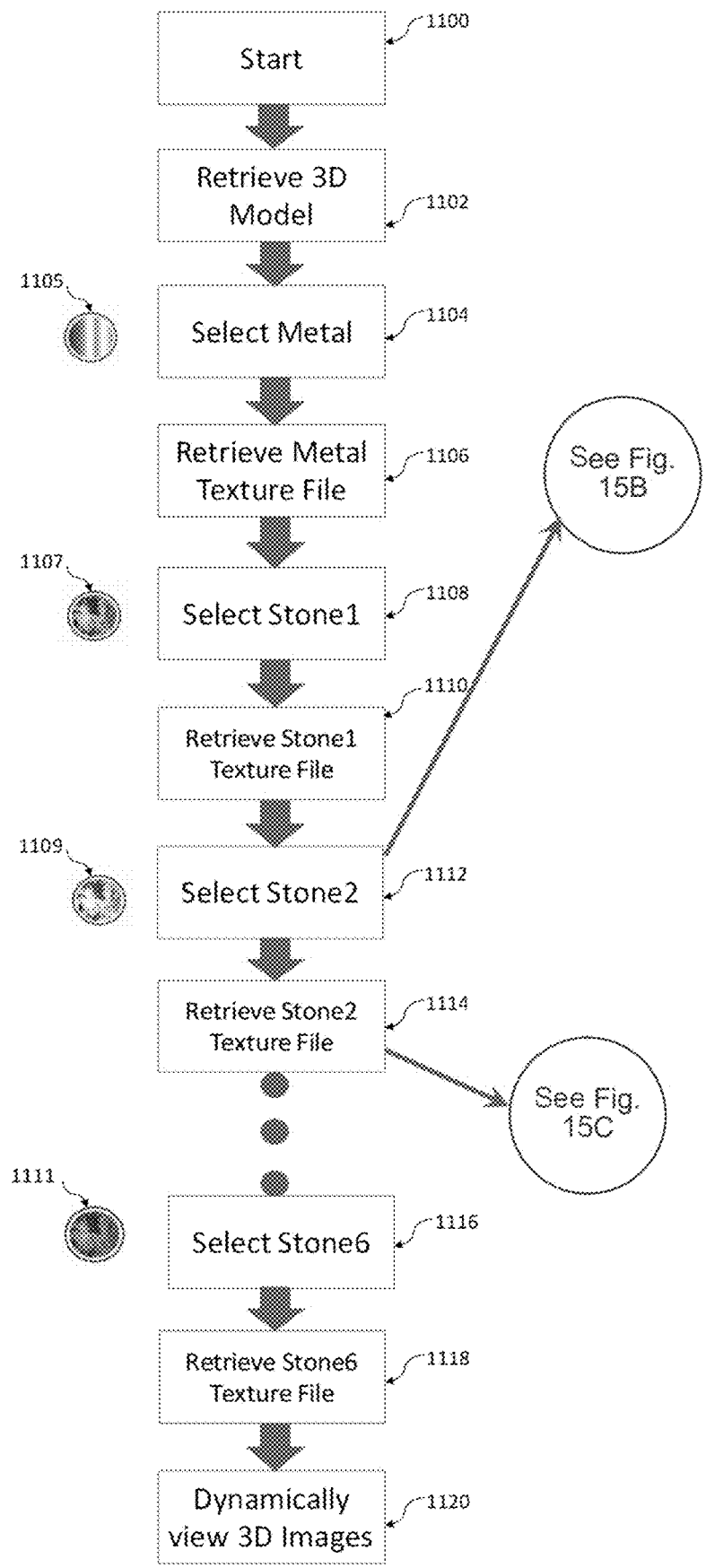
Figure 15B:
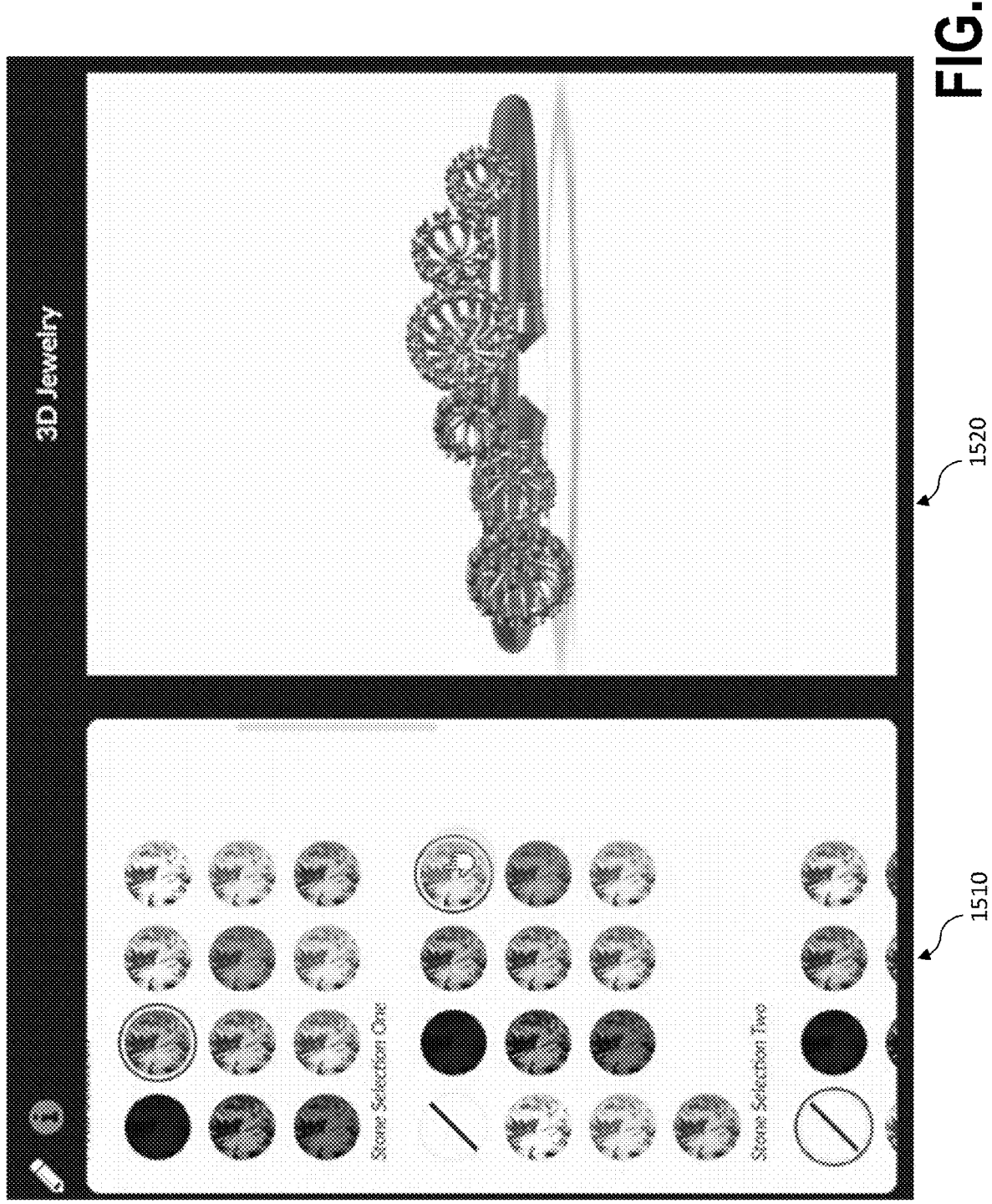
Figure 15C:
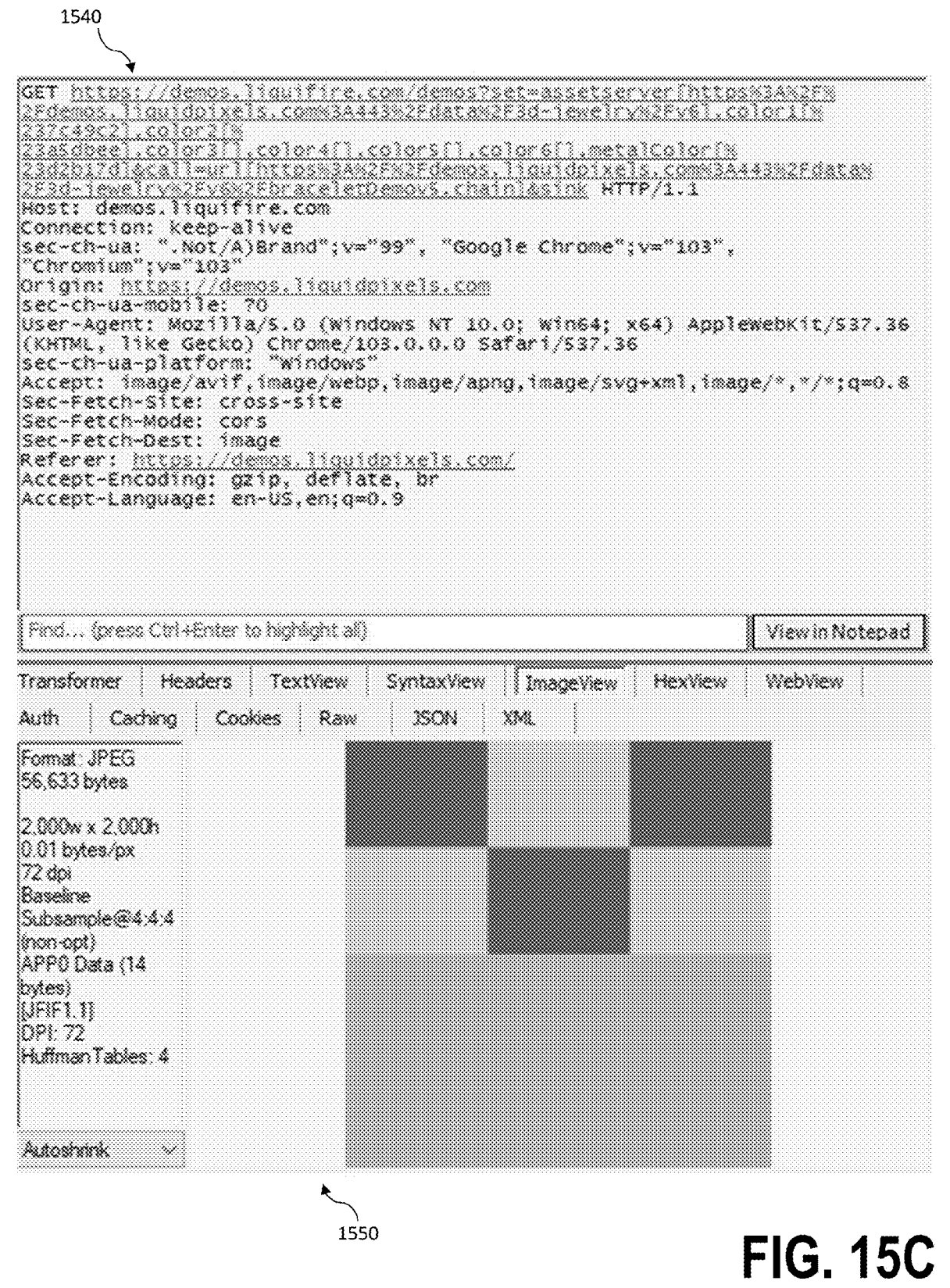

FIGS. 15A, 15B, and 15C illustrate a Select Stone2 step 1112 which receives the user input regarding stone 2 selection 1109 and a Retrieve Stone2 Texture File 1114 step which retrieves the texture files associated with the user selection of stone 2. A stone 2 selection user panel 1510 is illustrated, along with a stone 2 selection virtual object panel 1520. A Stone 2 Retrieve Texture File network trace panel 1540 is illustrated indicating the GET https://[URL} command with parameters that results in the retrieval of the stone 2 selection JPEG file containing metal selection, stone 1 and stone 2 images 1550.

As can be appreciated by one of skill in the art, selection of stones 3-5 and retrieval of the associated image files is performed similarly to the selection of stones 1 and 2 and the retrieval of those respective files.

Figure 16A:
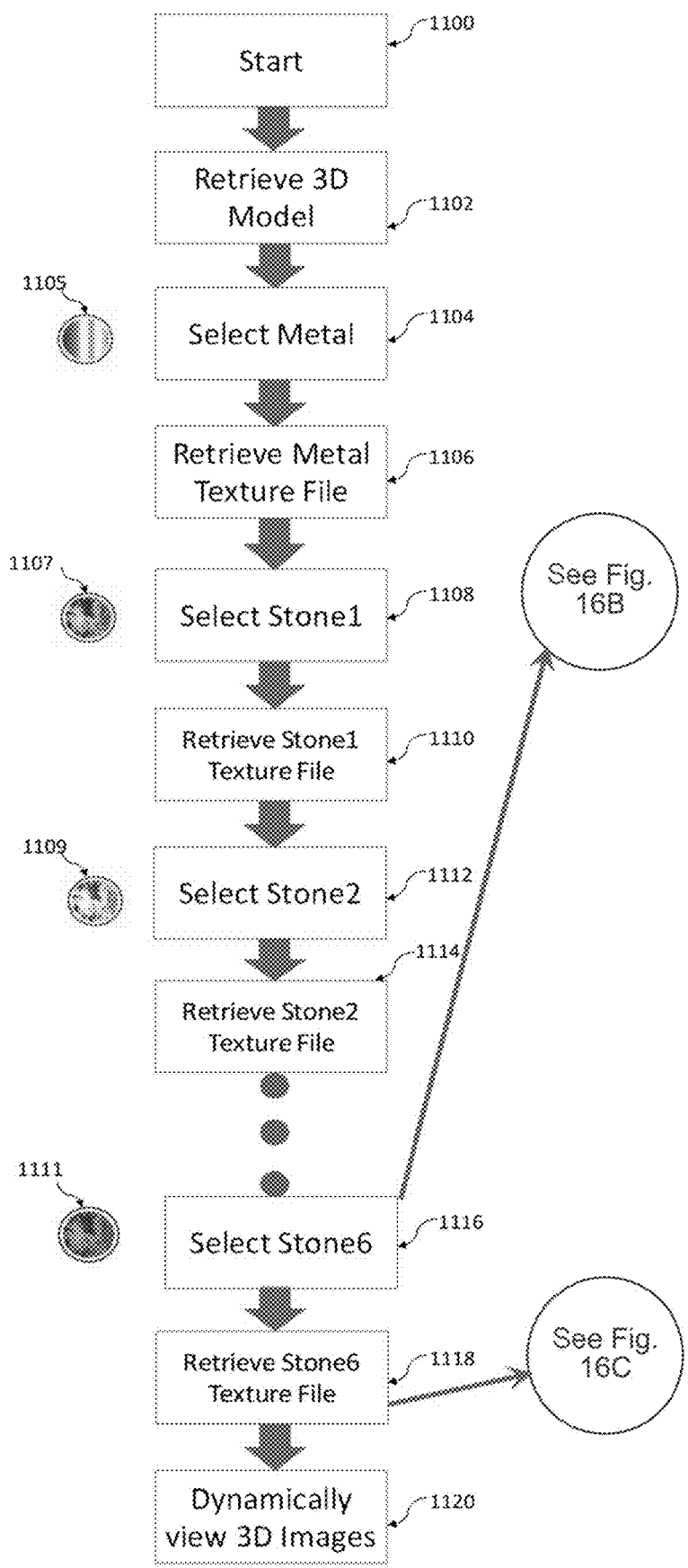
FIGS. 16A, 16B, and 16C represent a flowchart, a Stone 6 customization panel, and a network trace illustrating the retrieval of the textures to be applied to the 3D model, in accordance with example embodiments.
Figure 16B:
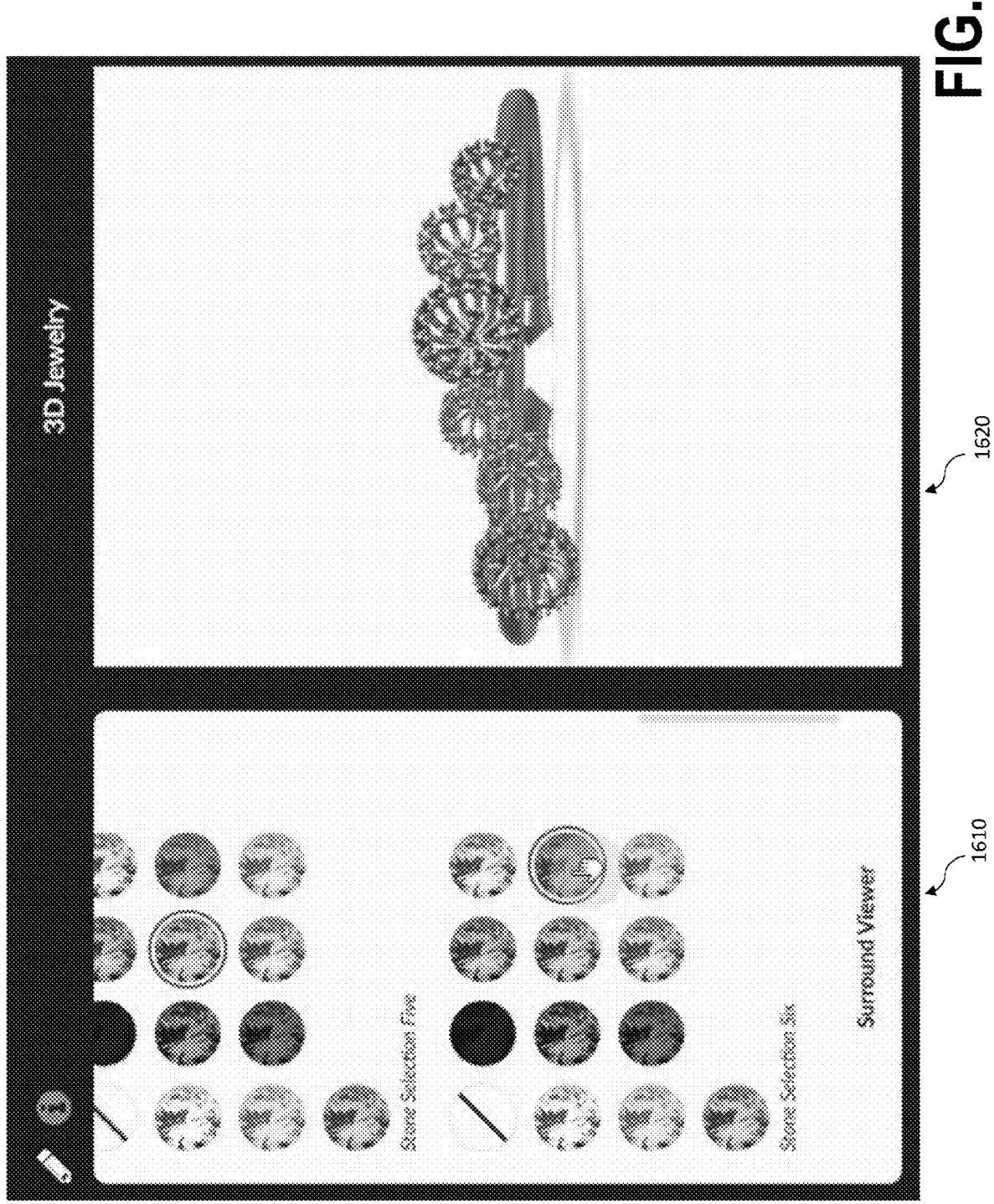
Figure 16C:
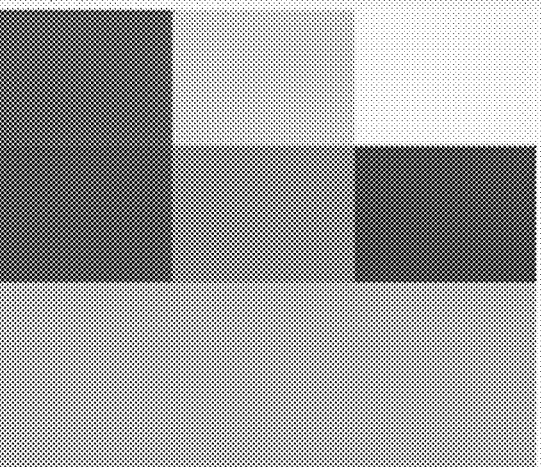

FIGS. 16A, 16B, and 16C illustrate a Select Stone6 step 1116 which receives the user input regarding stone 6 selection 1111 and a Retrieve Stone6 Texture File 1118 step which retrieves the texture files associated with the user selection of stone 6. A stone 6 selection user panel 1610 is illustrated, along with a stone 6 selection virtual object panel 1620. A Stone 6 Retrieve Texture File network trace panel 1640 is illustrated indicating the GET https://[URL} command with parameters that results in the retrieval of the stone 6 selection JPEG file containing metal selection, stone 1, stone 2, stone 3, stone 4, stone 5, and stone 6 images 1650.

Figure 17:
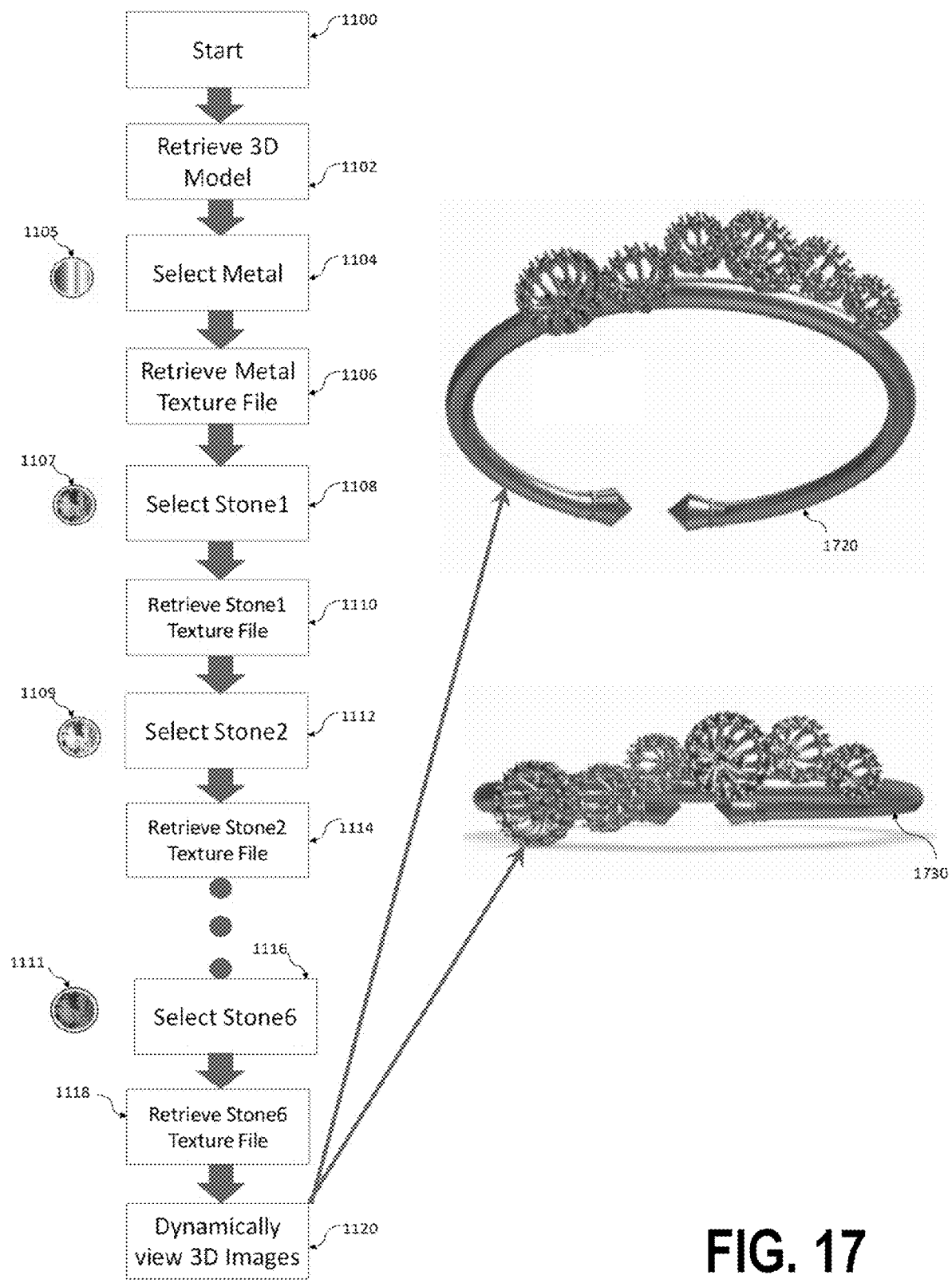
FIG. 17 represents a flowchart and dynamically generated views of the 3D model, in accordance with example embodiments.

FIG. 17 illustrates a Dynamically View 3D Images step 1120 in which the user can view the customized virtual object from a variety of perspectives including a first view 1720 or a second view 1730. Through the graphical viewer interface, the user can rotate the virtual object around any of the x, y or z axes as well zooming in or out on the object.

In some embodiments, the operations further comprise: requesting, by the graphical viewer, one or more further 2D textures for the object from the image server application; receiving, by the graphical viewer, the one or more further 2D textures from the image server application; based on the 3D model of the object and the one or more further 2D textures, updating, by the graphical viewer, the texturized image representation of the object; and displaying, by the graphical viewer, the texturized image representation of the object as updated.

In some embodiments, the operations further comprise: receiving, by the graphical viewer, a modification to the 3D model of the object; requesting, by the graphical viewer, one or more further 2D textures for the object as modified from the image server application; receiving, by the graphical viewer, the one or more further 2D textures from the image server application; based on the 3D model of the object as modified and the one or more further 2D textures, generating, by the graphical viewer, a further texturized image representation of the object as modified; and displaying, by the graphical viewer, the further texturized image representation of the object as modified.

In some embodiments, displaying the texturized image representation of the object comprises allowing the texturized image representation of the object to be translated, rotated, scaled, or magnified based on user input.

IV. Further Example Operations

Figure 18:
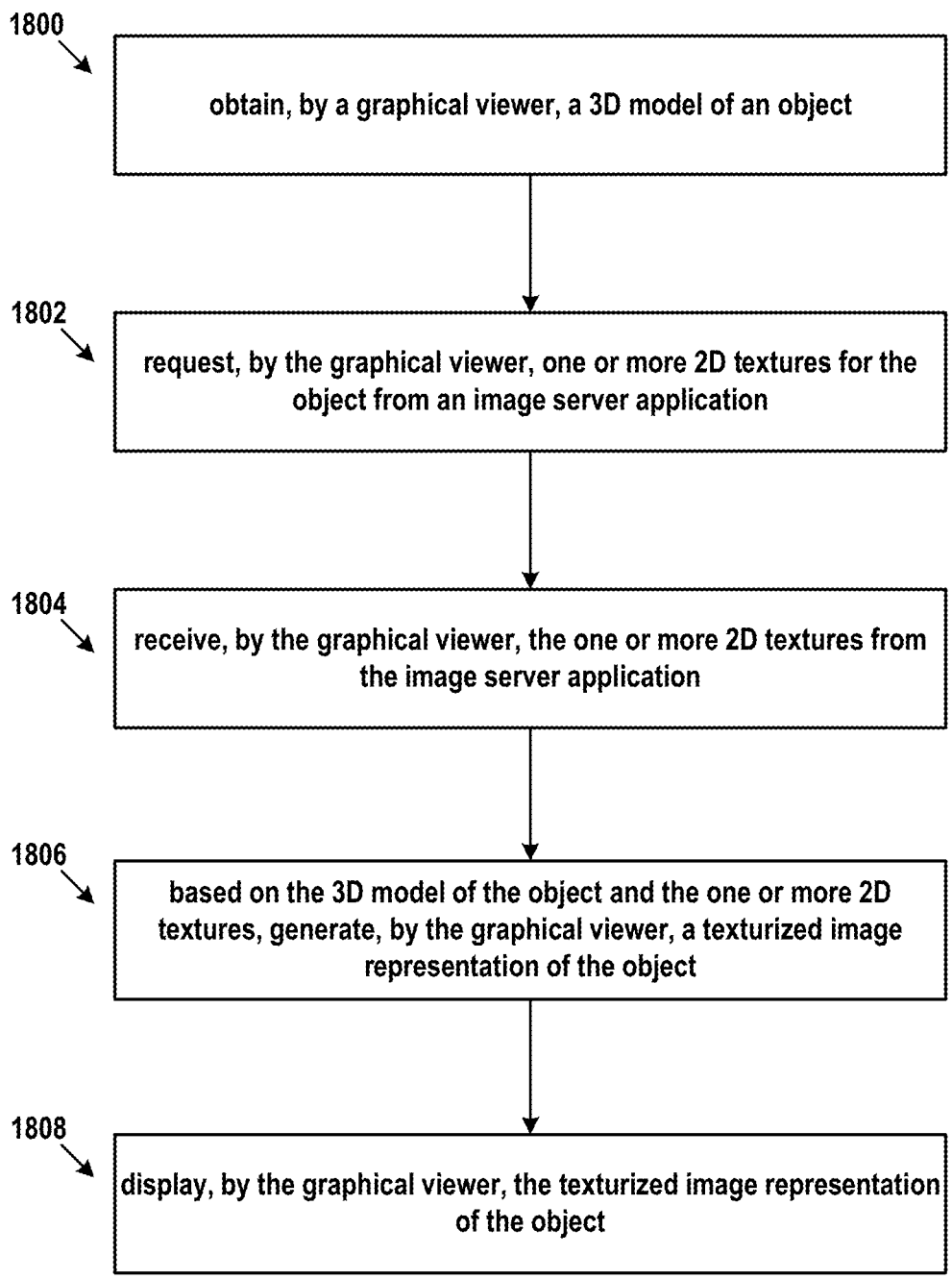
FIG. 18 represents a flowchart, in accordance with example embodiments.

FIG. 18 is a flow chart illustrating an example embodiment. The operations illustrated by FIG. 18 may be carried out by a computing system or computing device that includes a software application configured to render 3D objects. Non-limiting examples of the computing system or computing device include computing device 100 or server cluster 200, for example. However, the operations can be carried out by other types of devices or device subsystems. For example, the operations could be carried out by a portable computer, such as a laptop or a tablet device.

The embodiment of FIG. 18 may be simplified by the removal of any one or more of the features shown therein. Further, this embodiment may be combined with features, aspects, and/or implementations of any of the previous figures or otherwise described herein. Such an embodiment may include instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the embodiment.

Block 1800 involves obtaining, by a graphical viewer, a 3D model of an object.

Block 1802 involves requesting, by the graphical viewer, one or more 2D textures for the object from an image server application.

Block 1804 involves receiving, by the graphical viewer, the one or more 2D textures from the image server application.

Block 1806 involves, possibly based on the 3D model of the object and the one or more 2D textures, generating, by the graphical viewer, a texturized image representation of the object.

Block 1808 involves displaying, by the graphical viewer, the texturized image representation of the object.

Although the steps of FIG. 18 are stated as being carried out by a graphical viewer, some or all of these steps may be carried out by other software applications.

In some embodiments, obtaining the 3D model of the object comprises requesting and receiving the 3D model of the object from the image server application.

In some embodiments, requesting and receiving the 3D model of the object from the image server application and requesting and receiving the one or more 2D textures from the image server application occurs in a common transaction.

In some embodiments, the 3D model of the object specifies dimensions that define one or more surfaces of the object and 2D maps of at least some of the one or more surfaces.

In some embodiments, generating the texturized image representation of the object comprises applying the one or more 2D textures to the 2D maps.

In some embodiments, the 2D maps are respectively associated with unique identifiers, wherein each of the one or more 2D textures are associated with one or more of the unique identifiers, and wherein applying the one or more 2D textures to the 2D maps comprises applying the one or more 2D textures to the 2D maps with the same unique identifiers.

In some embodiments, the one or more 2D textures each specify one or more of a color, a pattern, an image, or textual content.

In some embodiments, the 3D model of the object or the one or more 2D textures are specified by way of a graphical user interface of the graphical viewer.

In some embodiments, the operations further comprise: requesting, by the graphical viewer, one or more further 2D textures for the object from the image server application; receiving, by the graphical viewer, the one or more further 2D textures from the image server application; based on the 3D model of the object and the one or more further 2D textures, updating, by the graphical viewer, the texturized image representation of the object; and displaying, by the graphical viewer, the texturized image representation of the object as updated.

In some embodiments, the operations further comprise: receiving, by the graphical viewer, a modification to the 3D model of the object; requesting, by the graphical viewer, one or more further 2D textures for the object as modified from the image server application; receiving, by the graphical viewer, the one or more further 2D textures from the image server application; based on the 3D model of the object as modified and the one or more further 2D textures, generating, by the graphical viewer, a further texturized image representation of the object as modified; and displaying, by the graphical viewer, the further texturized image representation of the object as modified.

In some embodiments, displaying the texturized image representation of the object comprises allowing the texturized image representation of the object to be translated, rotated, scaled, or magnified based on user input.

Figure 19:
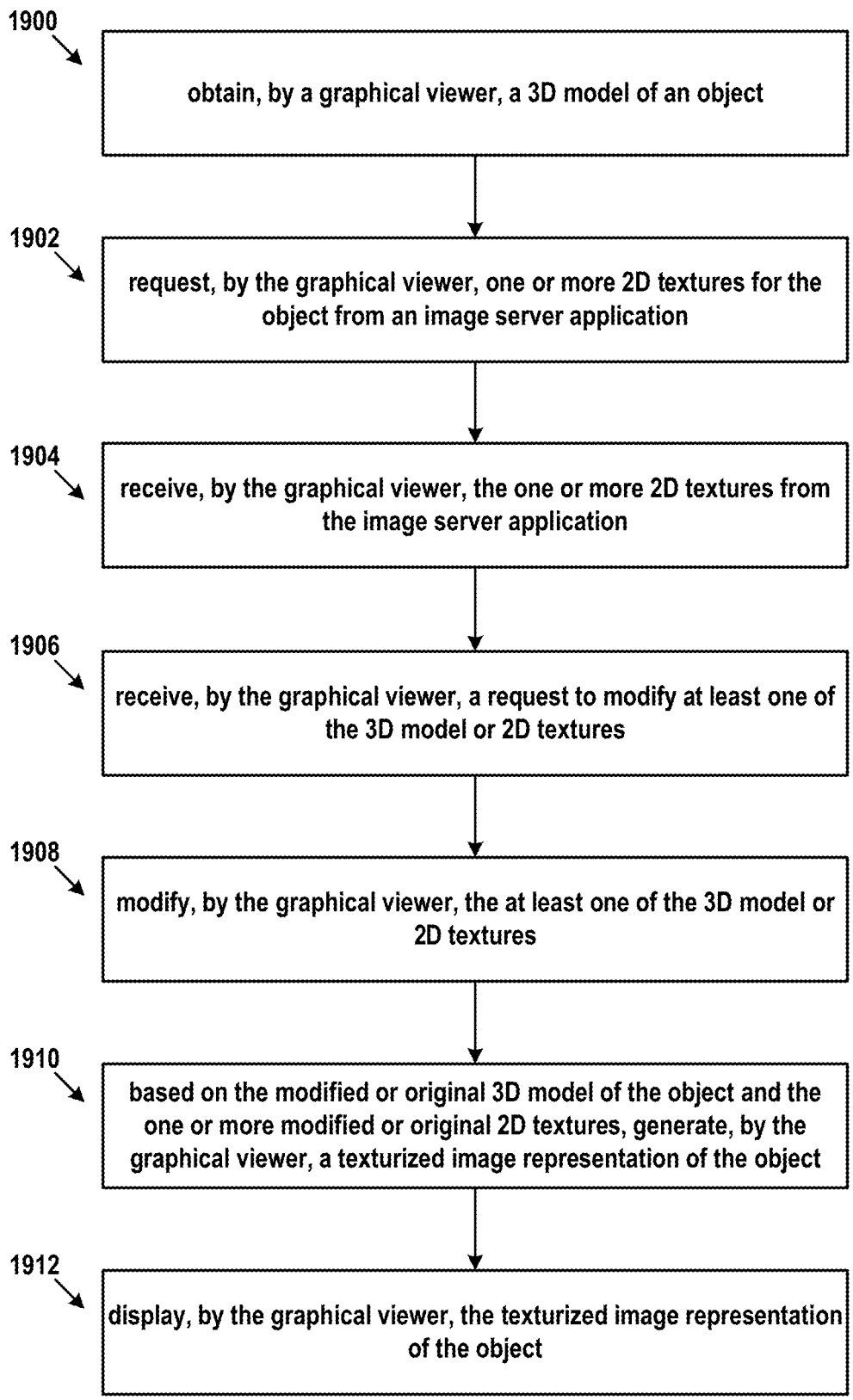
FIG. 19 represents a flowchart, in accordance with example embodiments.

FIG. 19 is a flow chart illustrating an example embodiment. The operations illustrated by FIG. 19 may be carried out by a computing system or computing device that includes a software application configured to render 3D objects. Non-limiting examples of the computing system or computing device include computing device 100 or server cluster 200, for example. However, the operations can be carried out by other types of devices or device subsystems. For example, the operations could be carried out by a portable computer, such as a laptop or a tablet device.

The embodiment of FIG. 19 may be simplified by the removal of any one or more of the features shown therein. Further, this embodiment may be combined with features, aspects, and/or implementations of any of the previous figures or otherwise described herein. Such an embodiment may include instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the embodiment.

Block 1900 involves obtaining, by a graphical viewer, a 3D model of an object.

Block 1902 involves requesting, by the graphical viewer, one or more 2D textures for the object from an image server application.

Block 1904 involves receiving, by the graphical viewer, the one or more 2D textures from the image server application.

Block 1906 involves receiving, by the graphical viewer, a request to modify at least one of the 3D model or 2D textures.

Block 1908 involves modifying, by the graphical viewer, the at least one of the 3D model or 2D textures.

Block 1910 involves based on the modified or original 3D model of the object and the one or more modified or original 2D textures, generating, by the graphical viewer, a texturized image representation of the object.

Block 1912 involves displaying, by the graphical viewer, the texturized image representation of the object.

Although the steps of FIG. 19 are stated as being carried out by a graphical viewer, some or all of these steps may be carried out by other software applications.

Some embodiments may further involve transmitting, by the graphical viewer and to a remote storage location, at least one of the 3D model as modified or 2D textures for remote storage.

In some embodiments, the remote storage location is the image server application.

In some embodiments, the remote storage location is an alternate server distinct from the image server application.

In some embodiments, modifying of the 3D model comprises alteration to: one or more dimensions of the 3D model.

In some embodiments, modifying of the 3D model comprises alteration to a shape of the 3D model.

In some embodiments, modifying of the 2D textures comprises alteration to a color of at least one of the 2D textures.

In some embodiments, modifying of the 2D textures comprises alteration to a pattern of at least one of the 2D textures.

In some embodiments, modifying of the 2D textures comprises alteration to a bumpiness of at least one of the 2D textures.

In some embodiments, the image server application is a distributed application running across multiple servers.

V. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An article of manufacture including a non-transitory computer-readable medium, having stored thereon program instructions that, upon execution by a computing system, cause the computing system to perform operations comprising:

requesting, by a graphical viewer and from an image server application in multiple transactions, a plurality of 3D models respectively representing different virtual representations of physical objects, wherein a dimension of at least one of the 3D models was modified by the image server application from an original form;

receiving, by the graphical viewer and from the image server application in a single transaction, a 3D model formed by combining the plurality of 3D models including the at least one 3D model with the dimension as modified, wherein the 3D model has a plurality of features;

displaying, by the graphical viewer, a representation of the physical objects with default 2D textures applied to meshes of the 3D model; and iteratively repeating, by the graphical viewer, for each respective feature of the plurality of features:

receiving a selection of a respective 2D texture from a respective set of 2D textures associated with the respective feature;

transmitting, to the image server application, one or more textual commands specifying characteristics of the respective 2D texture;
receiving the respective 2D texture from the image server application;
based on the 3D model of the physical objects and the respective 2D texture, generating a respective texturized image representation of the physical objects by replacing the default 2D texture of one or more meshes of the 3D model with the respective 2D texture; and
displaying the respective texturized image representation of the physical objects.

2. The article of manufacture of claim 1, wherein the 3D model of the physical objects specifies dimensions that define one or more surfaces of the physical objects and 2D maps of at least some of the one or more surfaces.

3. The article of manufacture of claim 2, wherein replacing the default 2D textures comprises applying the respective 2D texture to at least one of the 2D maps.

4. The article of manufacture of claim 3, wherein the 2D maps are respectively associated with unique identifiers, wherein each of the respective 2D textures are associated with one of the unique identifiers, and wherein applying the respective 2D texture to the 2D maps comprises applying the respective 2D texture to one of the 2D maps that has a common unique identifier.

5. The article of manufacture of claim 1, wherein the respective 2D texture specifies one or more of a color, a pattern, an image, or textual content.

6. The article of manufacture of claim 1, wherein the 3D model of the physical objects or the respective 2D texture is specified by way of a graphical user interface of the graphical viewer.

7. The article of manufacture of claim 1, wherein the operations further comprise:
requesting, by the graphical viewer, one or more further 2D textures for the physical objects from the image server application;
receiving, by the graphical viewer, the one or more further 2D textures from the image server application;
based on the 3D model of the physical objects and the one or more further 2D textures, updating, by the graphical viewer, the respective texturized image representation of the physical objects; and
displaying, by the graphical viewer, the respective texturized image representation of the physical objects as updated.

8. The article of manufacture of claim 1, wherein the operations further comprise:
receiving, by the graphical viewer, a modification to the 3D model of the physical objects;
requesting, by the graphical viewer, one or more further 2D textures for the physical objects as modified from the image server application;
receiving, by the graphical viewer, the one or more further 2D textures from the image server application;
based on the 3D model of the physical objects as modified and the one or more further 2D textures, generating, by the graphical viewer, a further texturized image representation of the physical objects as modified; and
displaying, by the graphical viewer, the further texturized image representation of the physical objects as modified.

9. The article of manufacture of claim 1, wherein displaying the respective texturized image representation of the physical objects comprises allowing the respective texturized image representation of the physical objects to be translated, rotated, scaled, or magnified based on user input.

10. The article of manufacture of claim 1, wherein the image server application is a distributed application executing across multiple server devices.

11. The article of manufacture of claim 1, further comprising:
transmitting, by the graphical viewer and to a remote storage location, at least one of the 3D model or one or more of the respective 2D textures.

12. The article of manufacture of claim 11, wherein the remote storage location is the image server application.

13. The article of manufacture of claim 11, wherein the remote storage location is an alternate server distinct from the image server application.

14. The article of manufacture of claim 1, wherein the dimension of the at least one of the 3D models being modified by the image server application from the original form comprises creating the at least one of the 3D models based on common objects.

15. The article of manufacture of claim 1, wherein the dimension of the at least one of the 3D models being modified by the image server application from the original form comprises modifying the dimension based on a user request.

16. A computer-implemented method comprising:
requesting, by a graphical viewer and from an image server application in multiple transactions, a plurality of 3D models respectively representing different virtual representations of physical objects, wherein a dimension of at least one of the 3D models was modified by the image server application from an original form;
receiving, by the graphical viewer and from the image server application in a single transaction, a 3D model formed by combining the plurality of 3D models including the at least one 3D model with the dimension as modified, wherein the 3D model has a plurality of features;
displaying, by the graphical viewer, a representation of the physical objects with default 2D textures applied to meshes of the 3D model; and
iteratively repeating, by the graphical viewer, for each respective feature of the plurality of features:
receiving a selection of a respective 2D texture from a respective set of 2D textures associated with the respective feature;
transmitting, to the image server application, one or more textual commands specifying characteristics of the respective 2D texture;
receiving the respective 2D texture from the image server application;
based on the 3D model of the physical objects and the respective 2D texture, generating a respective texturized image representation of the physical objects by replacing the default 2D texture of one or more meshes of the 3D model with the respective 2D texture; and
displaying the respective texturized image representation of the physical objects.

17. The computer-implemented method of claim 16, wherein the 3D model of the physical objects specifies dimensions that define one or more surfaces of the physical objects and 2D maps of at least some of the one or more surfaces.

18. The computer-implemented method of claim 17, wherein replacing the default 2D textures comprises applying the respective 2D texture to at least one of the 2D maps, wherein the 2D maps are respectively associated with unique identifiers, wherein each of the respective 2D textures are associated with one of the unique identifiers, and wherein applying the respective 2D texture to the 2D maps comprises applying the respective 2D texture to one of the 2D maps that has a common unique identifier.

19. A computing system comprising:
one or more processors;
memory; and
program instructions, stored in the memory, that upon execution by the one or more processors cause the computing system to perform operations comprising:
requesting, by a graphical viewer and from an image server application in multiple transactions, a plurality of 3D models respectively representing different virtual representations of physical objects, wherein a dimension of at least one of the 3D models was modified by the image server application from an original form;
receiving, by the graphical viewer and from the image server application in a single transaction, a 3D model formed by combining the plurality of 3D models including the at least one 3D model with the dimension as modified, wherein the 3D model has a plurality of features;
displaying, by the graphical viewer, a representation of the physical objects with default 2D textures applied to meshes of the 3D model; and
iteratively repeating, by the graphical viewer, for each respective feature of the plurality of features:
receiving a selection of a respective 2D texture from a respective set of 2D textures associated with the respective feature;
transmitting, to the image server application, one or more textual commands specifying characteristics of the respective 2D texture;
receiving the respective 2D texture from the image server application;
based on the 3D model of the physical objects and the respective 2D texture, generating a respective texturized image representation of physical objects by replacing the default 2D texture of one or more meshes of the 3D model with the respective 2D texture; and
displaying the respective texturized image representation of the physical objects.

\* \* \* \* \*

UNITED STATES PATENT AND TRADEMARK OFFICE
CERTIFICATE OF CORRECTION

PATENT NO. : 12,062,148 B2
APPLICATION NO. : 17/962224
DATED : August 13, 2024
INVENTOR(S) : Spencer et al.

Page 1 of 1

It is certified that error appears in the above-identified patent and that said Letters Patent is hereby corrected as shown below:

On the Title Page

Item (72) should read -- Marc D. Spencer, Fairport, NY (US); Evan Chapman, Fairport, NY (US); Eric Cirone, Fairport, NY (US); Maikel François Pierre Brands, Amsterdam (NL) --

Signed and Sealed this
Nineteenth Day of August, 2025

Coke Morgan Stewart
*Acting Director of the United States Patent and Trademark Office*